United States Patent
Jin

(10) Patent No.: US 9,839,002 B2
(45) Date of Patent: Dec. 5, 2017

(54) MOBILITY MANAGEMENT METHOD AND DEVICE

(71) Applicant: Huawei Technologies Co., Ltd., Shenzhen (CN)

(72) Inventor: Weisheng Jin, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 193 days.

(21) Appl. No.: 14/788,236

(22) Filed: Jun. 30, 2015

(65) Prior Publication Data

US 2015/0304988 A1 Oct. 22, 2015

Related U.S. Application Data

(63) Continuation of application No. PCT/CN2012/088133, filed on Dec. 31, 2012.

(51) Int. Cl.
| | |
|---|---|
| H04W 68/02 | (2009.01) |
| H04W 76/04 | (2009.01) |
| H04W 60/04 | (2009.01) |
| H04W 4/02 | (2009.01) |
| H04W 64/00 | (2009.01) |
| H04W 88/12 | (2009.01) |

(52) U.S. Cl.
CPC ............ *H04W 68/02* (2013.01); *H04W 4/02* (2013.01); *H04W 60/04* (2013.01); *H04W 64/003* (2013.01); *H04W 76/046* (2013.01); *H04W 88/12* (2013.01)

(58) Field of Classification Search
CPC ..... H04W 4/02; H04W 60/04; H04W 64/003; H04W 68/02; H04W 76/046; H04W 88/12

USPC ............... 455/436, 450-452.1, 458; 370/331
See application file for complete search history.

(56) References Cited

U.S. PATENT DOCUMENTS

| | | | |
|---|---|---|---|
| 9,218,482 B2 | 12/2015 | Ma et al. | |
| 2004/0227618 A1 | 11/2004 | Hwang et al. | |
| 2007/0117575 A1* | 5/2007 | Courau | H04W 68/00 455/458 |
| 2008/0032715 A1* | 2/2008 | Jia | H04W 68/12 455/458 |

(Continued)

FOREIGN PATENT DOCUMENTS

| | | |
|---|---|---|
| CN | 101047948 A | 10/2007 |
| CN | 101453778 A | 6/2009 |

(Continued)

*Primary Examiner* — Michael Mapa
(74) *Attorney, Agent, or Firm* — Slater Matsil, LLP

(57) ABSTRACT

Embodiments of the present invention provide a mobility management method and a device, where the mobility management method of a single radio controller includes: receiving a paging message for a UE sent by at least one first network device, where the paging message carries a user identifier used for indicating the UE; determining a paging management context of the UE according to the user identifier, where the paging management context of the UE records network standard information; and determining a paging range according to the paging message and the paging management context of the UE, and initiating paging on the UE in a cell in the paging range. The mobility management method and the device provided in the embodiments of the present invention implement optimization on a paging process and improve a mobility management effect.

20 Claims, 13 Drawing Sheets

(56) References Cited

U.S. PATENT DOCUMENTS

| | | | | |
|---|---|---|---|---|
| 2010/0124223 A1* | 5/2010 | Gibbs | ............... | H04W 28/06 |
| | | | | 370/389 |
| 2011/0065467 A1* | 3/2011 | Park | ............... | H04W 68/08 |
| | | | | 455/507 |
| 2011/0105155 A1* | 5/2011 | Bienas | ............... | H04W 68/02 |
| | | | | 455/458 |
| 2011/0310804 A1* | 12/2011 | Beygzadeh | ............... | H04W 68/00 |
| | | | | 370/328 |
| 2012/0258704 A1* | 10/2012 | Kim | ............... | H04W 52/0235 |
| | | | | 455/422.1 |
| 2013/0337851 A1 | 12/2013 | Yang et al. | | |

FOREIGN PATENT DOCUMENTS

| | | |
|---|---|---|
| CN | 101742645 A | 6/2010 |
| CN | 101742676 A | 6/2010 |
| CN | 102123498 A | 7/2011 |
| RU | 2275742 C2 | 4/2006 |
| WO | 2008100681 A1 | 8/2008 |
| WO | 2009089005 A2 | 7/2009 |
| WO | 2010071545 A1 | 6/2010 |
| WO | 2012089005 A1 | 7/2012 |

* cited by examiner

```
┌─────────────────────────────────────────────────────────────────────┐
│ A single radio controller SRC receives a paging message for a user  │
│ equipment UE sent by at least one first network device, where the    ├─ 111
│ paging message carries a user identifier used for indicating the UE │
└─────────────────────────────────────────────────────────────────────┘
                                  ↓
┌─────────────────────────────────────────────────────────────────────┐
│ The SRC determines a paging management context of the UE according  │
│ to the user identifier in the paging message, where the paging      │
│ management context of the UE records network standard information,   ├─ 112
│ and the network standard information is used for indicating a       │
│ network standard on which the UE camps when switching to an idle    │
│ state or a network standard to which the UE is redirected after     │
│ switching to an idle state                                          │
└─────────────────────────────────────────────────────────────────────┘
                                  ↓
┌─────────────────────────────────────────────────────────────────────┐
│ If the SRC first receives a first paging message from an interface  │
│ of a first network standard different from the network standard     │
│ indicated by the network standard information, determine a paging    │
│ range according to a location area identity in the first paging     │
│ message, and prepare a paging resource according to the paging      │
│ range; and if a second paging message is received, before paging    │
│ is performed by using the paging resource, from an interface of a   │
│ second network standard same as the network standard indicated by   │
│ the network standard information, release the paging resource, and  │
│ determine the paging range in the second network standard according │
│ to one or more of a historical record of the UE, a preset policy,   │
│ and a location area identity in the second paging message, or when  │
│ the paging management context of the UE further records a cell      │
│ identity used for indicating a cell on which the UE camps when      ├─ 113
│ switching to the idle state or a cell identity used for indicating  │
│ a cell to which the UE is redirected after switching to the idle    │
│ state, determine the paging range in the second network standard    │
│ according to the cell identity; or if the SRC first receives a first│
│ paging message from an interface of a first network standard        │
│ different from the network standard indicated by the network        │
│ standard information, and receives a second paging message during a │
│ third preset time from an interface of a second network standard    │
│ same as the network standard indicated by the network standard      │
│ information, determine a paging range in the second network standard│
│ according to one or more of a historical record of the UE, a preset │
│ policy, and a location area identity in the second paging message,  │
│ or when the paging management context of the UE further records a   │
│ cell identity used for indicating a cell on which the UE camps when │
│ switching to the idle state or a cell identity used for indicating a│
│ cell to which the UE is redirected after switching to the idle      │
│ state, determine the paging range in the second network standard    │
│ according to the cell identity; and                                 │
│ initiate paging on the UE in a cell in the paging range             │
└─────────────────────────────────────────────────────────────────────┘
                                  ↓
┌─────────────────────────────────────────────────────────────────────┐
│ If the SRC does not receive a paging response from the UE during a  │
│ first preset time, determine, according to the location area        ├─ 124
│ identity in the second paging message, all cells with which the UE  │
│ registers in the second network standard                            │
└─────────────────────────────────────────────────────────────────────┘
                                  ↓
┌─────────────────────────────────────────────────────────────────────┐
│ The SRC initiates paging on the UE in the all cells with which the  ├─ 125
│ UE registers in the second network standard                         │
└─────────────────────────────────────────────────────────────────────┘
                                  ↓
┌─────────────────────────────────────────────────────────────────────┐
│ If the SRC does not receive the paging response from the UE during  │
│ a second preset time, determine, according to the location area     │
│ identity in the first paging message and the location area identity ├─ 126
│ in the second paging message, all cells with which the UE registers │
│ in the first network standard and the second network standard       │
└─────────────────────────────────────────────────────────────────────┘
                                  ↓
┌─────────────────────────────────────────────────────────────────────┐
│ The SRC initiates paging on the UE in the all cells with which the  ├─ 127
│ UE registers in the first network standard and the second network   │
│ standard                                                            │
└─────────────────────────────────────────────────────────────────────┘
```

FIG. 5

A single radio controller SRC receives a paging message for a user equipment UE sent by at least one first network device, where the paging message carries a user identifier used for indicating the UE — 111

The SRC determines a paging management context of the UE according to the user identifier in the paging message, where the paging management context of the UE records network standard information, and the network standard information is used for indicating a network standard on which the UE camps when switching to an idle state or a network standard to which the UE is redirected after switching to an idle state — 112

CONT. FROM
FIG. 6A

If the SRC first receives a first paging message from an interface of a first network standard different from the network standard indicated by the network standard information, and activation indication information in the first paging message used for indicating that idle state signaling reduction ISR of the UE is activated, prepare a paging resource according to a location area identity in the first paging message; and if a second paging message is received, before paging is performed by using the paging resource, from an interface of a second network standard same as the network standard indicated by the network standard information, release the paging resource, and determine a paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the SRC first receives a first paging message from an interface of a first network standard different from the network standard indicated by the network standard information, activation indication information in the first paging message used for indicating that ISR of the UE is activated, and a second paging message is received during a third preset time from an interface of a second network standard same as the network standard indicated by the network standard information, release the paging resource, and determine the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used to indicate a cell to which the UE is redirected after switching to the idle state, determine the paging range in the second network standard according to the cell identity; or if the SRC first receives a first paging message from an interface of a first network standard different from the network standard indicated by the network standard information, and activation indication information in the first paging message used for indicating that ISR of the UE is not activated, determine a paging range in the first network standard according to a location area identity in the first paging message; and initiate paging on the UE in a cell in the paging range

 113

CONT. FROM
FIG. 6B

If the SRC does not receive a paging response from the UE during a first preset time, determine, according to the location area identity in the first paging message, all cells with which the UE registers in the first network standard — 134

The SRC initiates paging on the UE in the all cells with which the UE registers in the first network standard — 135

If the SRC does not receive the paging response from the UE during a second preset time, determine, according to the location area identity in the first paging message and the location area identity in the second paging message, all cells with which the UE registers in the first network standard and the second network standard — 136

The SRC initiates paging on the UE in the all cells with which the UE registers in the first network standard and the second network standard — 137

FIG. 6C

MOBILITY MANAGEMENT METHOD AND DEVICE

This application is a continuation of International Application No. PCT/CN2012/088133, filed on Dec. 31, 2012, which is hereby incorporated by reference in its entirety.

TECHNICAL FIELD

Embodiments of the present invention relate to communications technologies, and in particular, to a mobility management method and a device.

BACKGROUND

As communications technologies develop, the 3rd Generation Partnership Project (3GPP for short) has studied and standardized the 3G Long Term Evolution (LTE for short) technology, expecting to obtain a higher speed, a larger capacity, and better user performance. In an initial phase of LTE deployment, an LTE network is deployed only in a hotspot, but a 2G/3G network covers all areas. In an area in which various wireless networks overlap or adjoin each other, when a UE (user equipment) moves back and forth between an LTE network and a 2G/3G network, the UE needs to perform inter-system cell reselection, where inter-system cell reselection each time causes a location update process of the UE, so that information about a location with which the UE registers in a core network is updated, thereby increasing a large amount of signaling load in the network and on an air interface.

To resolve the foregoing problem, an idle mode signaling reduction (ISR for short) mechanism is introduced in 3GPP. After the ISR mechanism is activated, when the UE moves in a coverage with which the UE has registered, the UE does not need to perform a location update even though the UE crosses different standards. In addition, if a network needs to page the UE, paging is performed on the UE in cells in location areas with which the UE registers in different network standards. However, the UE can camp on only one network standard to listen to a paging message in one cell, and therefore, a waste of system air interface resources is caused in the prior art when paging is performed in all location areas with which the UE registers. Therefore, an optimization method for paging UE in hybrid network standards needs to be proposed.

SUMMARY

Embodiments of the present invention provide a mobility management method and a device, so as to implement optimization on a paging process and improve a mobility management effect.

According to a first aspect, an embodiment of the present invention provides a mobility management method, including:

receiving, by a single radio controller SRC, a paging message for a user equipment UE sent by at least one first network device, where the paging message carries a user identifier used for indicating the UE;

determining, by the SRC, a paging management context of the UE according to the user identifier in the paging message, where the paging management context of the UE records network standard information, and the network standard information is used for indicating a network standard on which the UE camps when switching to an idle state or a network standard to which the UE is redirected after switching to an idle state; and determining, by the SRC, a paging range according to the paging message and the paging management context of the UE, and initiating paging on the UE in a cell in the paging range.

In a first possible implementation manner, the paging message received by the SRC includes a first paging message; and the determining, by the SRC, a paging range according to the paging message and the paging management context of the UE includes:

if the SRC first receives the first paging message from an interface of a first network standard same as the network standard indicated by the network standard information, determining the paging range in the first network standard according to a historical record of the UE or a preset policy, or if the paging management context of the UE further records the cell identity used for indicating a cell on which the UE camps when switching to the idle state or the cell identity used for indicating a cell to which the UE is redirected after switching to the idle state, determining the paging range in the first network standard according to a cell identity.

With reference to the first possible implementation manner of the first aspect, in a second possible implementation manner, the paging message carries a location area identity; and after the initiating, by the SRC, paging on the UE in a cell in the paging range, the method further includes:

if the SRC does not receive a paging response from the UE during a first preset time, determining, according to a location area identity in the first paging message, all cells with which the UE registers in the first network standard; and initiating, by the SRC, paging on the UE in the all cells with which the UE registers in the first network standard.

With reference to the second possible implementation manner of the first aspect, in a third possible implementation manner, the paging message received by the SRC further includes a second paging message, and the first network standard to which the first paging message belongs is different from a second network standard to which the second paging message belongs; and after the initiating, by the SRC, paging on the UE in the all cells with which the UE registers in the first network standard, the method further includes:

if the SRC does not receive the paging response from the UE during a second preset time, determining, according to the location area identity in the first paging message and a location area identity in the second paging message, all cells with which the UE registers in the first network standard and the second network standard; and initiating, by the SRC, paging on the UE in the all cells with which the UE registers in the first network standard and the second network standard.

In a fourth possible implementation manner, the paging message carries a location area identity, the paging message received by the SRC includes a first paging message and a second paging message, and the paging management context of the UE further records a cell identity used for indicating a cell on which the UE camps when switching to the idle state or a cell identity used for indicating a cell to which the UE is redirected after switching to the idle state; and the determining, by the SRC, a paging range according to the paging message and the paging management context of the UE includes:

if the SRC first receives the first paging message from a first interface of a first network standard, the first network standard is the same as the network standard indicated by the network standard information, and the first interface is different from a second interface corresponding to the cell indicated by the cell identity, determining the paging range according to a location area identity in the first paging message, and preparing a paging resource according to the paging range; and if the second paging message is received from the second interface of the first network standard before paging is performed by using the paging resource, releasing the paging resource, and determining, according to one or more of the cell identity, a historical record of the UE, a preset policy, and a location area identity in the second paging message, the paging range in a cell of a second network device corresponding to the second interface; or if the SRC first receives the first paging message from a first interface of a first network standard, the first network standard is the same as the network standard indicated by the network standard information, the first interface is different from a second interface corresponding to the cell indicated by the cell identity, and the second paging message is received from the second interface of the first network standard during a third preset time, determining, according to one or more of the cell identity, a historical record of the UE, a preset policy, and a location area identity in the second paging message, the paging range in a cell of a second network device corresponding to the second interface; or if the SRC first receives the first paging message from a first interface of a first network standard, the first network standard is the same as the network standard indicated by the network standard information, and the first interface is the same as a second interface corresponding to the cell indicated by the cell identity, determining the paging range according to a location area identity in the first paging message, and paging the UE according to the paging range; and if the second paging message is received from a third interface of the first network standard during a fourth preset time, and the third interface is different from the second interface, after the fourth preset time elapses and when a paging response from the UE is not received, determining, according to one or more of the cell identity, a historical record of the UE, a preset policy, and location area identities in the first paging message and the second paging message, the paging range in a cell of a second network device corresponding to the first interface and the second interface.

In a fifth possible implementation manner, the paging message carries a location area identity, and the paging message received by the SRC includes a first paging message and a second paging message; and the determining, by the SRC, a paging range according to the paging message and the paging management context of the UE includes:

if the SRC first receives the first paging message from an interface of a first network standard different from the network standard indicated by the network standard information, determining the paging range according to a location area identity in the first paging message, and preparing a paging resource according to the paging range; and if the second paging message is received, before paging is performed by using the paging resource, from an interface of a second network standard same as the network standard indicated by the network standard information, releasing the paging resource, and determining the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determining the paging range in the second network standard according to the cell identity; or if the SRC first receives the first paging message from an interface of a first network standard different from the network standard indicated by the network standard information, and receives the second paging message during a third preset time from an interface of a second network standard same as the network standard indicated by the network standard information, determining the paging range in the second network standard according to one or more of a historical record of the UE, a preset policy, and a location area identity in the second paging message; or if the SRC first receives the first paging message from an interface of a first network standard different from the network standard indicated by the network standard information, and the paging management context of the UE further records a cell identity used for indicating a cell on which the UE camps when switching to the idle state or a cell identity used for indicating a cell to which the UE is redirected after switching to the idle state, determining the paging range in the second network standard according to the cell identity.

With reference to the fifth possible implementation manner of the first aspect, in a sixth possible implementation manner, after the initiating, by the SRC, paging on the UE in a cell in the paging range, the method further includes:

if the SRC does not receive a paging response from the UE during a first preset time, determining, according to the location area identity in the second paging message, all cells with which the UE registers in the second network standard; and initiating, by the SRC, paging on the UE in the all cells with which the UE registers in the second network standard.

With reference to the sixth possible implementation manner of the first aspect, in a seventh possible implementation manner, after the initiating, by the SRC, paging on the UE in the all cells with which the UE registers in the second network standard, the method further includes:

if the SRC does not receive the paging response from the UE during a second preset time, determining, according to the location area identity in the first paging message and the location area identity in the second paging message, all cells with which the UE registers in the first network standard and the second network standard; and initiating, by the SRC, paging on the UE in the all cells with which the UE registers in the first network standard and the second network standard.

In an eighth possible implementation manner, the paging message carries activation indication information and a location area identity, and the paging message received by the SRC includes a first paging message and a second paging message; and the determining, by the SRC, a paging range according to the paging message and the paging management context of the UE includes:

if the SRC first receives the first paging message from an interface of a first network standard different from the network standard indicated by the network standard information, and activation indication information in the first paging message is used for indicating that idle state signaling reduction ISR of the UE is activated, preparing a paging resource according to a location area identity in the first paging message; and if the second paging message is received, before paging is performed by using the paging resource, from an interface of a second network standard same as the network standard indicated by the network standard information, releasing the paging resource, and determining the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determining the paging range in the second network standard according to the cell identity; or if the SRC first receives the first paging message from an interface of a first network standard different from the network standard indicated by the network standard information, activation indication information in the first paging message is used for indicating that ISR of the UE is activated, and the second paging message is received during a third preset time from an interface of a second network standard same as the network standard indicated by the network standard information, releasing a paging resource, and determining the paging range in the second network standard according to one or more of a historical record of the UE, a preset policy, and a location area identity in the second paging message; or if the SRC first receives the first paging message from an interface of a first network standard different from the network standard indicated by the network standard information, activation indication information in the first paging message is used for indicating that ISR of the UE is activated, and the paging management context of the UE further records a cell identity used for indicating a cell on which the UE camps when switching to the idle state or a cell identity used for indicating a cell to which the UE is redirected after switching to the idle state, determining the paging range in the second network standard according to the cell identity; or if the SRC first receives the first paging message from an interface of a first network standard different from the network standard indicated by the network standard information, and activation indication information in the first paging message is used for indicating that ISR of the UE is not activated, determining the paging range in the first network standard according to a location area identity in the first paging message.

With reference to the eighth possible implementation manner of the first aspect, in a ninth possible implementation manner, after the initiating, by the SRC, paging on the UE in a cell in the paging range, the method further includes:

if the SRC does not receive a paging response from the UE during a first preset time, determining, according to the location area identity in the first paging message, all cells with which the UE registers in the first network standard; and initiating, by the SRC, paging on the UE in the all cells with which the UE registers in the first network standard.

With reference to the ninth possible implementation manner of the first aspect, in a tenth possible implementation manner, the first network standard to which the first paging message belongs is different from the second network standard to which the second paging message belongs; and after the initiating, by the SRC, paging on the UE in the all cells with which the UE registers in the first network standard, the method further includes:

if the SRC does not receive the paging response from the UE during a second preset time, determining, according to the location area identity in the first paging message and the location area identity in the second paging message, all cells with which the UE registers in the first network standard and the second network standard; and initiating, by the SRC, paging on the UE in the all cells with which the UE registers in the first network standard and the second network standard.

In an eleventh possible implementation manner, before the receiving, by an SRC, a paging message for a user equipment UE sent by at least one first network device, the method further includes:

recording, by the SRC, location information of the UE in a network standard in which the UE is located when being in a connected state, so as to form the paging management context of the UE.

With reference to the eleventh possible implementation manner of the first aspect, in a twelfth possible implementation manner, before the receiving, by an SRC, a paging message for a user equipment UE sent by at least one first network device, the method further includes:

receiving, by the SRC, a detect UE deactivation message sent by a second network device, and sending a UE context release request message to the first network device;

receiving, by the SRC, a UE context release command message sent by the first network device, and sending a radio resource control RRC context release indication message to the second network device, where the RRC context release indication message carries network standard indication information and/or frequency indication information; and receiving, by the SRC, a UE context release complete indication message sent by the second network device, and sending a UE context release complete message to the first network device.

With reference to the twelfth possible implementation manner of the first aspect, in a thirteenth possible implementation manner, before the receiving, by an SRC, a paging message for a user equipment UE sent by at least one first network device, the method further includes:

receiving, by the SRC, a UE connection release request message sent by a second network device;

sending, by the SRC, a UE connection release response message to the second network device, where the UE connection release response message carries network standard indication information and/or frequency indication information; and receiving, by the SRC, a UE context release complete indication message sent by the second network device.

With reference to the twelfth or thirteenth possible implementation manner of the first aspect, in a fourteenth possible implementation manner, the method further includes:

updating, by the SRC, the paging management context of the UE according to the network standard indication information and/or the frequency indication information.

According to a second aspect, an embodiment of the present invention provides a single radio controller, including:

a receiving unit, configured to receive a paging message for a user equipment UE sent by at least one first network device, where the paging message carries a user identifier used for indicating the UE;

a processing unit, configured to determine a paging management context of the UE according to the user identifier in the paging message received by the receiving unit, and determine a paging range according to the paging message and the paging management context of the UE, where the paging management context of the UE records network standard information, and the network standard information is used for indicating a network standard on which the UE camps when switching to an idle state or a network standard to which the UE is redirected after switching to an idle state; and a paging unit, configured to initiate paging on the UE in a cell in the paging range determined by the processing unit.

In a first possible implementation manner, the paging message received by the SRC includes a first paging message; and the processing unit is specifically configured to, if a first paging message is first received from an interface of a first network standard same as the network standard indicated by the network standard information, determine the paging range in the first network standard according to a historical record of the UE or a preset policy, or if the paging management context of the UE further records the cell identity used for indicating a cell on which the UE camps when switching to the idle state or the cell identity used for indicating a cell to which the UE is redirected after switching to the idle state, determine the paging range in the first network standard according to a cell identity.

With reference to the first possible implementation manner of the second aspect, in a second possible implementation manner, the paging message carries a location area identity;

the processing unit is further configured to, if a paging response from the UE is not received during a first preset time, determine, according to a location area identity in the first paging message, all cells with which the UE registers in the first network standard; and the paging unit is further configured to initiate paging on the UE in the all cells with which the UE registers in the first network standard.

With reference to the second possible implementation manner of the second aspect, in a third possible implementation manner, the paging message received by the SRC further includes a second paging message, and the first network standard to which the first paging message belongs is different from a second network standard to which the second paging message belongs;

the processing unit is further configured to, if the paging response from the UE is not received during a second preset time, determine, according to the location area identity in the first paging message and a location area identity in the second paging message, all cells with which the UE registers in the first network standard and the second network standard; and the paging unit is further configured to initiate paging on the UE in the all cells with which the UE registers in the first network standard and the second network standard.

In a fourth possible implementation manner, the paging message carries a location area identity, the paging message received by the SRC includes a first paging message and a second paging message, and the paging management context of the UE further records a cell identity used for indicating a cell on which the UE camps when switching to the idle state or a cell identity used for indicating a cell to which the UE is redirected after switching to the idle state; and the processing unit is specifically configured to, if the first paging message is first received from a first interface of a first network standard, the first network standard is the same as the network standard indicated by the network standard information, and the first interface is different from a second interface corresponding to the cell indicated by the cell identity, determine the paging range according to a location area identity in the first paging message, and prepare a paging resource according to the paging range; and if the second paging message is received from the second interface of the first network standard before paging is performed by using the paging resource, release the paging resource, and determine, according to one or more of the cell identity, a historical record of the UE, a preset policy, and a location area identity in the second paging message, the paging range in a cell of a second network device corresponding to the second interface; or if the first paging message is first received from a first interface of a first network standard, the first network standard is the same as the network standard indicated by the network standard information, the first interface is different from a second interface corresponding to the cell indicated by the cell identity, and the second paging message is received from the second interface of the first network standard during a third preset time, determine, according to one or more of the cell identity, a historical record of the UE, a preset policy, and a location area identity in the second paging message, the paging range in a cell of a second network device corresponding to the second interface; or if the first paging message is first received from a first interface of a first network standard, the first network standard is the same as the network standard indicated by the network standard information, and the first interface is the same as a second interface corresponding to the cell indicated by the cell identity, determine the paging range according to a location area identity in the first paging message, and page the UE according to the paging range; and if the second paging message is received from a third interface of the first network standard during a fourth preset time, and the third interface is different from the second interface, after the fourth preset time elapses and when a paging response from the UE is not received, determine, according to one or more of the cell identity, a historical record of the UE, a preset policy, and location area identities in the first paging message and the second paging message, the paging range in a cell of a second network device corresponding to the first interface and the second interface.

In a fifth possible implementation manner, the paging message carries a location area identity, and the paging message received by the SRC includes a first paging message and a second paging message; and the processing unit is specifically configured to, if the first paging message is first received from an interface of a first network standard different from the network standard indicated by the network standard information, determine the paging range according to a location area identity in the first paging message, and prepare a paging resource according to the paging range; and if the second paging message is received, before paging is performed by using the paging resource, from an interface of a second network standard same as the network standard indicated by the network standard information, release the paging resource, and determine the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, and the second paging message is received during a third preset time from an interface of a second network standard same as the network standard indicated by the network standard information, determine the paging range in the second network standard according to one or more of a historical record of the UE, a preset policy, and a location area identity in the second paging message; or if the first paging message is first received from an interface of a first network standard different from the network standard indicated by the network standard information, and the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity.

With reference to the fifth possible implementation manner of the second aspect, in a sixth possible implementation manner, the processing unit is further configured to, if a paging response from the UE is not received during a first preset time, determine, according to the location area identity in the second paging message, all cells with which the UE registers in the second network standard; and the paging unit is further configured to initiate paging on the UE in the all cells with which the UE registers in the second network standard.

With reference to the sixth possible implementation manner of the second aspect, in a seventh possible implementation manner, the processing unit is further configured to, if the paging response from the UE is not received during a second preset time, determine, according to the location area identity in the first paging message and the location area identity in the second paging message, all cells with which the UE registers in the first network standard and the second network standard; and the paging unit is further configured to initiate paging on the UE in the all cells with which the UE registers in the first network standard and the second network standard.

In an eighth possible implementation manner, the paging message carries activation indication information and a location area identity, and the paging message received by the SRC includes a first paging message and a second paging message; and the processing unit is specifically configured to, if the first paging message is first received from an interface of a first network standard different from the network standard indicated by the network standard information, and activation indication information in the first paging message is used for indicating that idle state signaling reduction ISR of the UE is activated, prepare a paging resource according to a location area identity in the first paging message; and if the second paging message is received, before paging is performed by using the paging resource, from an interface of a second network standard same as the network standard indicated by the network standard information, release the paging resource, and determine the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, activation indication information in the first paging message is used for indicating that ISR of the UE is activated, and the second paging message is received during a third preset time from an interface of a second network standard same as the network standard indicated by the network standard information, release a paging resource, and determine the paging range in the second network standard according to one or more of a historical record of the UE, a preset policy, and a location area identity in the second paging message; if the first paging message is first received from an interface of a first network standard different from the network standard indicated by the network standard information, activation indication information in the first paging message is used for indicating that ISR of the UE is activated, and the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, and activation indication information in the first paging message is used for indicating that ISR of the UE is not activated, determine the paging range in the first network standard according to a location area identity in the first paging message.

With reference to the eighth possible implementation manner of the second aspect, in a ninth possible implementation manner, the processing unit is further configured to, if a paging response from the UE is not received during a first preset time, determine, according to the location area identity in the first paging message, all cells with which the UE registers in the first network standard; and the paging unit is further configured to initiate paging on the UE in the all cells with which the UE registers in the first network standard.

With reference to the ninth possible implementation manner of the second aspect, in a tenth possible implementation manner, the first network standard to which the first paging message belongs is different from the second network standard to which the second paging message belongs;

the processing unit is further configured to, if the paging response from the UE is not received during a second preset time, determine, according to the location area identity in the first paging message and the location area identity in the second paging message, all cells with which the UE registers in the first network standard and the second network standard; and the paging unit is further configured to initiate paging on the UE in the all cells with which the UE registers in the first network standard and the second network standard.

In an eleventh possible implementation manner, the single radio controller further includes:

a recording unit, connected to the processing unit and configured to record location information of the UE in a network standard in which the UE is located when being in a connected state, so as to form the paging management context of the UE.

With reference to the eleventh possible implementation manner of the second aspect, in a twelfth possible implementation manner, the receiving unit is further configured to receive a detect UE deactivation message sent by a second network device; receive a UE context release command message sent by the first network device; and receive a UE context release complete indication message sent by the second network device; and the single radio controller further includes:

a sending unit, configured to send a UE context release request message to the first network device; send a radio resource control RRC context release indication message to the second network device, where the RRC context release indication message carries network standard indication information and/or frequency indication information; and send a UE context release complete message to the first network device.

With reference to the twelfth possible implementation manner of the second aspect, in a thirteenth possible implementation manner, the receiving unit is further configured to receive a UE connection release request message sent by a second network device; and receive a UE context release complete indication message sent by the second network device; and the single radio controller further includes:

a sending unit, configured to send a UE connection release response message to the second network device, where the UE connection release response message carries network standard indication information and/or frequency indication information.

With reference to the twelfth or thirteenth possible implementation manner of the second aspect, in a fourteenth possible implementation manner, the recording unit is further configured to update the paging management context of the UE according to the network standard indication information and/or the frequency indication information.

According to a third aspect, an embodiment of the present invention provides a single radio controller, including:

a receiver, configured to receive a paging message for a user equipment UE sent by at least one first network device, where the paging message carries a user identifier used for indicating the UE;

a processor, configured to determine a paging management context of the UE according to the user identifier in the paging message received by the receiver, and determine a paging range according to the paging message and the paging management context of the UE, where the paging management context of the UE records network standard information, and the network standard information is used for indicating a network standard on which the UE camps when switching to an idle state or a network standard to which the UE is redirected after switching to an idle state; and a transmitter, configured to initiate paging on the UE in a cell in the paging range determined by the processor.

In a first possible implementation manner, the paging message received by the SRC includes a first paging message; and the processor is specifically configured to, if a first paging message is first received from an interface of a first network standard same as the network standard indicated by the network standard information, determine the paging range in the first network standard according to a historical record of the UE or a preset policy, or if the paging management context of the UE further records the cell identity used for indicating a cell on which the UE camps when switching to the idle state or the cell identity used for indicating a cell to which the UE is redirected after switching to the idle state, determine the paging range in the first network standard according to a cell identity.

With reference to the first possible implementation manner of the third aspect, in a second possible implementation manner, the paging message carries a location area identity;

the processor is further configured to, if a paging response from the UE is not received during a first preset time, determine, according to a location area identity in the first paging message, all cells with which the UE registers in the first network standard; and the transmitter is further configured to initiate paging on the UE in the all cells with which the UE registers in the first network standard.

With reference to the second possible implementation manner of the third aspect, in a third possible implementation manner, the paging message received by the SRC further includes a second paging message, and the first network standard to which the first paging message belongs is different from a second network standard to which the second paging message belongs;

the processor is further configured to, if the paging response from the UE is not received during a second preset time, determine, according to the location area identity in the first paging message and a location area identity in the second paging message, all cells with which the UE registers in the first network standard and the second network standard; and the transmitter is further configured to initiate paging on the UE in the all cells with which the UE registers in the first network standard and the second network standard.

In a fourth possible implementation manner, the paging message carries a location area identity, the paging message received by the SRC includes a first paging message and a second paging message, and the paging management context of the UE further records a cell identity used for indicating a cell on which the UE camps when switching to the idle state or a cell identity used for indicating a cell to which the UE is redirected after switching to the idle state; and the processor is specifically configured to, if the first paging message is first received from a first interface of a first network standard, the first network standard is the same as the network standard indicated by the network standard information, and the first interface is different from a second interface corresponding to the cell indicated by the cell identity, determine the paging range according to a location area identity in the first paging message, and prepare a paging resource according to the paging range; and if the second paging message is received from the second interface of the first network standard before paging is performed by using the paging resource, release the paging resource, and determine, according to one or more of the cell identity, a historical record of the UE, a preset policy, and a location area identity in the second paging message, the paging range in a cell of a second network device corresponding to the second interface; or if the first paging message is first received from a first interface of a first network standard, the first network standard is the same as the network standard indicated by the network standard information, the first interface is different from a second interface corresponding to the cell indicated by the cell identity, and the second paging message is received from the second interface of the first network standard during a third preset time, determine, according to one or more of the cell identity, a historical record of the UE, a preset policy, and a location area identity in the second paging message, the paging range in a cell of a second network device corresponding to the second interface; or if the first paging message is first received from a first interface of a first network standard, the first network standard is the same as the network standard indicated by the network standard information, and the first interface is the same as a second interface corresponding to the cell indicated by the cell identity, determine the paging range according to a location area identity in the first paging message, and page the UE according to the paging range; and if the second paging message is received from a third interface of the first network standard during a fourth preset time, and the third interface is different from the second interface, after the fourth preset time elapses and when a paging response from the UE is not received, determine, according to one or more of the cell identity, a historical record of the UE, a preset policy, and location area identities in the first paging message and the second paging message, the paging range in a cell of a second network device corresponding to the first interface and the second interface.

In a fifth possible implementation manner, the paging message carries a location area identity, and the paging message received by the SRC includes a first paging message and a second paging message; and the processor is specifically configured to, if the first paging message is first received from an interface of a first network standard different from the network standard indicated by the network standard information, determine the paging range according to a location area identity in the first paging message, and prepare a paging resource according to the paging range; and if the second paging message is received, before paging is performed by using the paging resource, from an interface of a second network standard same as the network standard indicated by the network standard information, release the paging resource, and determine the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, and the second paging message is received during a third preset time from an interface of a second network standard same as the network standard indicated by the network standard information, determine the paging range in the second network standard according to one or more of a historical record of the UE, a preset policy, and a location area identity in the second paging message; or if the first paging message is first received from an interface of a first network standard different from the network standard indicated by the network standard information, and the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity.

With reference to the fifth possible implementation manner of the third aspect, in a sixth possible implementation manner, the processor is further configured to, if a paging response from the UE is not received during a first preset time, determine, according to the location area identity in the second paging message, all cells with which the UE registers in the second network standard; and the transmitter is further configured to initiate paging on the UE in the all cells with which the UE registers in the second network standard.

With reference to the sixth possible implementation manner of the third aspect, in a seventh possible implementation manner, the processor is further configured to, if the paging response from the UE is not received during a second preset time, determine, according to the location area identity in the first paging message and the location area identity in the second paging message, all cells with which the UE registers in the first network standard and the second network standard; and the transmitter is further configured to initiate paging on the UE in the all cells with which the UE registers in the first network standard and the second network standard.

In an eighth possible implementation manner, the paging message carries activation indication information and a location area identity, and the paging message received by the SRC includes a first paging message and a second paging message; and the processor is specifically configured to, if the first paging message is first received from an interface of a first network standard different from the network standard indicated by the network standard information, and activation indication information in the first paging message is used for indicating that idle state signaling reduction ISR of the UE is activated, prepare a paging resource according to a location area identity in the first paging message; and if the second paging message is received, before paging is performed by using the paging resource, from an interface of a second network standard same as the network standard indicated by the network standard information, release the paging resource, and determine the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, activation indication information in the first paging message is used for indicating that ISR of the UE is activated, and the second paging message is received during a third preset time from an interface of a second network standard same as the network standard indicated by the network standard information, release a paging resource, and determine the paging range in the second network standard according to one or more of a historical record of the UE, a preset policy, and a location area identity in the second paging message; or if the first paging message is first received from an interface of a first network standard different from the network standard indicated by the network standard information, activation indication information in the first paging message is used for indicating that ISR of the UE is activated, and the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, and activation indication information in the first paging message is used for indicating that ISR of the UE is not activated, determine the paging range in the first network standard according to a location area identity in the first paging message.

With reference to the eighth possible implementation manner of the third aspect, in a ninth possible implementation manner, the processor is further configured to, if a paging response from the UE is not received during a first preset time, determine, according to the location area identity in the first paging message, all cells with which the UE registers in the first network standard; and the transmitter is further configured to initiate paging on the UE in the all cells with which the UE registers in the first network standard.

With reference to the ninth possible implementation manner of the third aspect, in a tenth possible implementation manner, the first network standard to which the first paging message belongs is different from the second network standard to which the second paging message belongs;

the processor is further configured to, if the paging response from the UE is not received during a second preset time, determine, according to the location area identity in the first paging message and the location area identity in the second paging message, all cells with which the UE registers in the first network standard and the second network standard; and the transmitter is further configured to initiate paging on the UE in the all cells with which the UE registers in the first network standard and the second network standard.

In an eleventh possible implementation manner, the processor is further configured to record location information of the UE in a network standard in which the UE is located when being in a connected state, so as to form the paging management context of the UE.

With reference to the eleventh possible implementation manner of the third aspect, in a twelfth possible implementation manner, the receiver is further configured to receive a detect UE deactivation message sent by a second network device; receive a UE context release command message sent by the first network device; and receive a UE context release complete indication message sent by the second network device; and the transmitter is further configured to send a UE context release request message to the first network device; send a radio resource control RRC context release indication message to the second network device, where the RRC context release indication message carries network standard indication information and/or frequency indication information; and send a UE context release complete message to the first network device.

With reference to the twelfth possible implementation manner of the third aspect, in a thirteenth possible implementation manner, the receiver is further configured to receive a UE connection release request message sent by a second network device; and receive a UE context release complete indication message sent by the second network device; and the transmitter is further configured to send a UE connection release response message to the second network device, where the UE connection release response message carries network standard indication information and/or frequency indication information.

With reference to the twelfth or thirteenth possible implementation manner of the third aspect, in a fourteenth possible implementation manner, the processor is further configured to update the paging management context of the UE according to the network standard indication information and/or the frequency indication information.

According to the mobility management method and the device provided in the embodiments of the present invention, an SRC receives a paging message sent by at least one first network device, where the paging message carries a user identifier used for indicating user equipment UE; determines a paging management context of the UE according to the user identifier in the paging message; determines a paging range according to the paging message and the paging management context of the UE, where the paging management context of the UE records network standard information and a cell identity, the network standard information and the cell identity are used for indicating a cell in a network standard in which the UE is located when being in a connected state for the last time before switching to an idle state; and initiates paging on the UE in a cell in the paging range. The SRC may receive paging messages from interfaces of different network standards, and determine, according to the paging messages and the paging management context of the UE, a paging range in the network standard recorded in the paging management context of the UE, thereby implementing optimization on a paging process, and in particular, avoiding a waste of resources caused because when ISR of the UE is activated, first network devices in different network standards perform paging in all cells in a location area with which the UE registers. Therefore, a mobility management effect is improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 5 is a flowchart of a third mobility management method according to an embodiment of the present invention;

FIG. 6A, FIG. 6B and FIG. 6C are a flowchart of a fourth mobility management method according to an embodiment of the present invention;

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
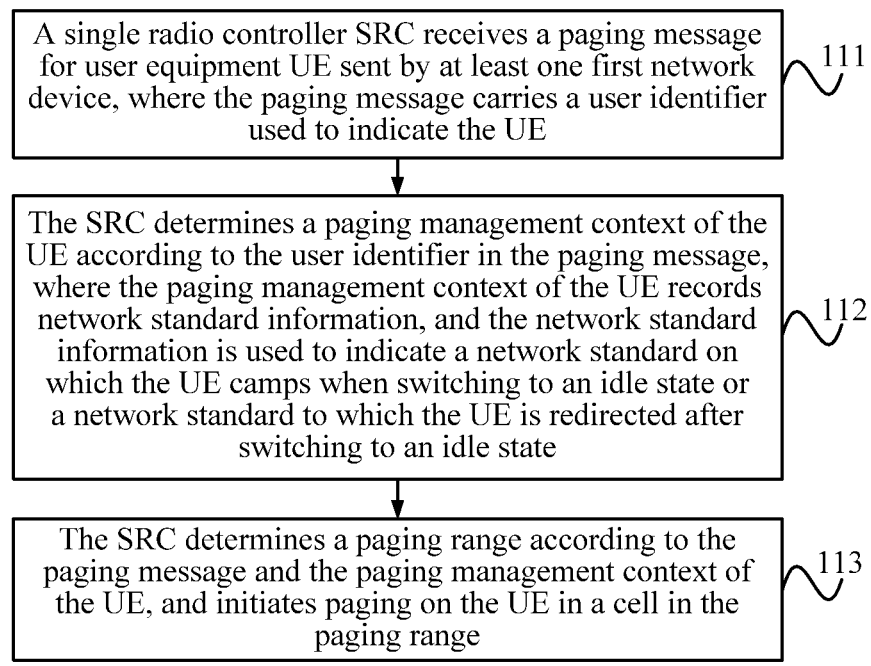
FIG. 1 is a flowchart of a first mobility management method according to an embodiment of the present invention.

FIG. 1 is a flowchart of a first mobility management method according to an embodiment of the present invention. As shown in FIG. 1, the mobility management method provided in this embodiment of the present invention may be specifically applied to an application scenario in which at least two network standards coexist, such as an LTE network and a 2G/3G network. The 2G network may be a GSM (Global System for Mobile Communications) network, a TDMA (Time Division Multiple Access) network, and the like; the 3G network may be a WCDMA (Wideband Code Division Multiple Access) network, a TD-SCDMA (Time Division-Synchronous Code Division Multiple Access) network, and the like. Network elements in the LTE network specifically include a P-GW (packet data network gateway), an S-GW (serving gateway), an MME (mobility management entity), and an eNB (evolved NodeB). Network elements in the 2G network specifically include a P-GW, an S-GW, an SGSN (serving GPRS support node), a BTS (base transceiver station), and a BSC (base station controller). Network elements in the 3G network specifically include a P-GW, an S-GW, an SGSN, a Node B (NodeB), and an RNC (radio network controller). For ease of description, an application scenario in which an LTE network and a 2G/3G network coexist is used for description in the following embodiments. However, the present invention is not limited thereto.

The mobility management method provided in this embodiment specifically includes:

Step 111: A single radio controller SRC receives a paging message for a user equipment UE sent by at least one first network device, where the paging message carries a user identifier used for indicating the UE.

Step 112: The SRC determines a paging management context of the UE according to the user identifier in the paging message, where the paging management context of the UE records network standard information, and the network standard information is used for indicating a network standard on which the UE camps when switching to an idle state or a network standard to which the UE is redirected after switching to an idle state.

Step 113: The SRC determines a paging range according to the paging message and the paging management context of the UE, and initiates paging on the UE in a cell in the paging range.

Specifically, the SRC (single radio controller) is a newly added network element, and the SRC may centrally manage second network devices of different network standards in a same area. In this area, the SRC may manage one or more second network devices of a same network standard, each second network device has a corresponding first network device, and each first network device or second network device interacts with the SRC by using a respective interface. In an LTE network, the first network device is an MME, and the second network device is an eNB; in a 2G network, the first network device is an SGSN, and the second network device is a BSC; in a 3G network, the first network device is an SGSN, and the second network device is an RNC. In a practical implementation process, the SRC may also be integrated into the BSC and/or the RNC, or the SRC, the BSC, and the RNC may be integrated together.

Figure 2:
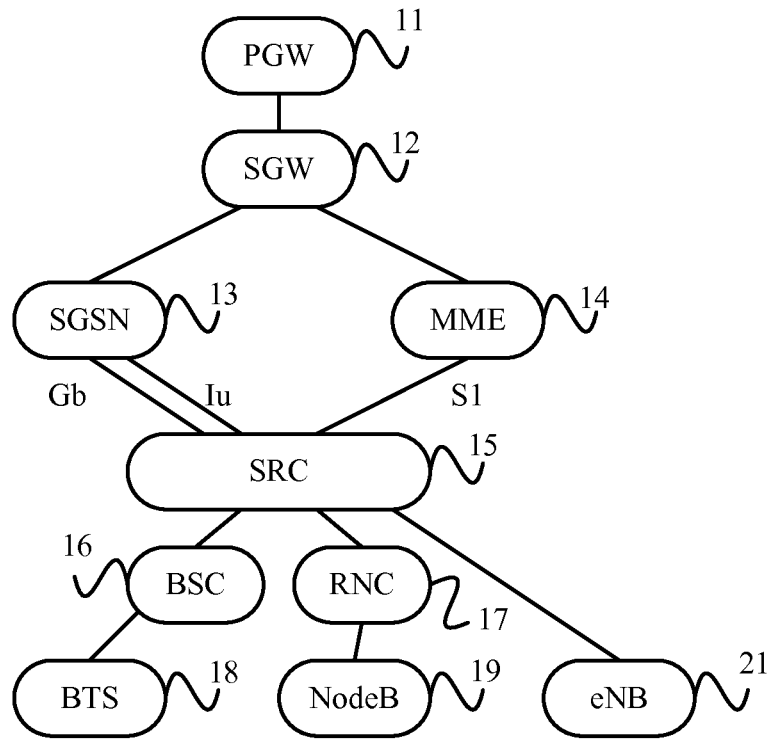
FIG. 2 is a schematic diagram of a network architecture according to an embodiment of the present invention.

In a network architecture, an SRC may be disposed between a first network device and a second network device, and the SRC is provided with interfaces for second network devices in different network standards in this area and interfaces for first network devices in the different network standards. As shown in FIG. 2, in the network architecture, a P-GW 11, an S-GW 12, an SGSN 13, an MME 14, an SRC 15, a BSC 16, an RNC 17, a BTS 18, a Node B 19, and an eNB 21 are disposed; interfaces between the SRC 15 and the SGSN 13 are Gb/Iu; an interface between the SRC 15 and the MME 14 is S1; there may be one or more Gb, Iu, or S1 interfaces in one SRC 15.

Figure 3:
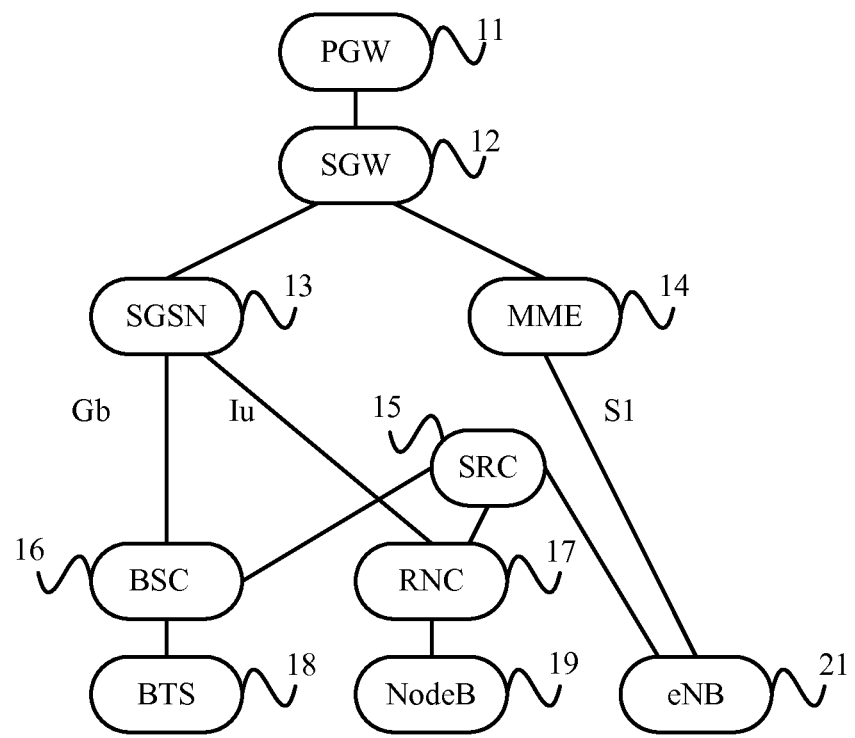
FIG. 3 is a schematic diagram of another network architecture according to an embodiment of the present invention.

In another network architecture, an SRC is not directly connected to a first network device, the SRC may be provided with interfaces for second network devices in different network standards in this area, and the second network devices may forward, to the SRC, signaling sent by first network devices. As shown in FIG. 3, in the network architecture, a P-GW 11, an S-GW 12, an SGSN 13, an MME 14, an SRC 15, a BSC 16, an RNC 17, a BTS 18, a Node B 19, and an eNB 21 are disposed; an interface between the SGSN 13 and the BSC 16 is Gb; an interface between the SGSN 13 and the RNC 17 is Iu; an interface between the MME 14 and the eNB 21 is S1; the SRC 15 directly interacts with the BSC 16, the RNC 17, and the eNB 21; there may be one or more BSCs 16, RNCs 17, or eNBs 21 that are connected to one SRC15. In a practical application process, the user identifier is used for indicating the UE, and all interaction information between network elements in a network may carry the user identifier or a session of the interaction information is bound with the user identifier used for indicating an object served by the network. The user identifier may be specifically a permanent identity IMSI (international mobile subscriber identity) or a temporary identity S-TMSI, P-TMSI, or the like. It should be noted that when the UE is in a connected state, the SRC may receive a permanent identity IMSI of the UE from signaling by using an Iu interface in a 3G network standard; on a Gb interface in a 2G network standard, the first network device may be configured so as to send the permanent identity IMSI of the UE by using signaling on the Gb interface, and the SRC may also obtain the IMSI of the UE; in an LTE network standard, the first network device does not send the IMSI of the UE to an access network by using an S1 interface. Therefore, before the UE switches to the idle state, if the UE is in the 2G/3G network standard, the paging management context of the UE records the permanent identity IMSI; if the UE is in the LTE network standard, the paging management context of the UE may record only the temporary identity S-TMSI. For a UE that is handed over from a cell that is in the 2G/3G network standard and controlled by the SRC to a cell in the LTE network standard, and then switches to the idle state, the SRC may also identify a permanent identity IMSI of the UE and record the IMSI into a paging management context of the UE. In the 2G/3G/LTE network standard, a paging message sent by the first network device to the SRC carries the permanent identity IMSI and temporary identities P-TMSI and S-TMSI of the UE. Therefore, after receiving paging messages that are for the UE that is in the 2G/3G network standard before switching to the idle state and are sent from interfaces of different network standards, the SRC can find the paging management context of the UE according to the permanent identity IMSI of the UE. If the paging management context of the UE does not record the IMSI of the UE (when the UE is in the LTE network standard before switching to the idle state), the SRC can determine the paging management context of the UE only after receiving a paging message for the UE from an interface that is in the LTE network standard and for the first network device. If the paging management context of the UE records the IMSI of the UE (the UE is handed over from a cell in the 2G/3G network standard of the SRC to a cell in the LTE network standard, or the interface that is in the LTE network standard and for the first network device includes the IMSI into a connected-state signaling), after receiving paging messages that are for the UE that is in the 2G/3G network standard before switching to the idle state and are sent from interfaces of different network standards, the SRC can find the paging management context of the UE according to the permanent identity IMSI of the UE. The paging management context of the UE further records the network standard information used for indicating the network standard on which the UE camps when switching to the idle state or the network standard to which the UE is redirected after switching to the idle state, and the paging management context of the UE further records a cell identity used for indicating a cell. If a message delivered by the SRC does not indicate a network standard and a frequency and/or a cell, a cell of the network standard on which the UE camps and recorded in the paging management context of the UE is a cell in which the UE is located when being in the connected state for the last time before switching to the idle state. If the message delivered by the SRC indicates a network standard and a frequency and/or a cell, and ISR of the UE is activated, the UE enters the indicated network standard and frequency and/or cell after switching to the idle state, and does not initiate a location update; wherein, the cell of the network standard on which the UE camps in the paging management context of the UE is the indicated network standard and cell.

After the UE switches to the idle state, downlink data of the UE arrives at a P-GW, the P-GW sends the downlink data to an S-GW, the S-GW separately sends a downlink data notification message to an MME and an SGSN, and the MME and the SGSN separately send a paging message to the SRC in the network architecture shown in FIG. 2; or in the network architecture shown in FIG. 3, the MME sends a paging message to the eNB, the SGSN sends a paging message to the BSC/RNC, and the eNB/BSC/RNC do not perform direct paging but forward the paging messages to the SRC. The SRC may receive a paging message from one or more interfaces of different network standards, and the SRC determines a paging range according to a network standard of the received paging message and the network standard recorded in the paging management context of the UE, where the paging range includes one or more cells that are in a coverage of the SRC and in a first network standard recorded in the paging management context of the UE.

There may be multiple implementation manners of determining, by the SRC, the paging range according to the paging message and the paging management context of the UE.

In a first implementation manner, the SRC may receive a paging message from one or more interfaces of different network standards in a relatively short time, where if one of the different network standards is the first network standard recorded in the paging management context of the UE, paging may be first performed on the UE in the first network standard. The paging range may be a cell recorded in the paging management context of the UE or the cell and its surrounding cells.

The SRC may further record in advance a network standard and a cell on which the UE camps in a past preset period of time, so as to form a historical record of the UE, and therefore, the paging range may be a cell that is in the first network standard and that is determined by the SRC according to the historical record of the UE. The SRC may further determine a cell in the first network standard according to an operator policy, and the operator policy may be specifically a policy preset by an operator. For example, when a cell on which the UE camps before switching to the idle state and recorded in the paging management context of the UE is a railway station, it is considered that a user may enter a transport vehicle such as a train and move along a line, and therefore, the paging range may be a cell in this line.

The paging message sent by the first network device carries a location area identity, where the location area identity is used for indicating a location area with which the UE has registered. For example, in a 2G/3G network, the UE registers an RAI (Routing Area ID, routing area identity) in an SGSN; or in an LTE network, the UE registers a TAI list (tracking area identity) in an MME. The location area identity may be a routing area identity or a tracking area identity list. Therefore, the paging range may be a cell determined by the SRC according to a location area indicated by a location area identity carried in a paging message that is received from an interface of the first network standard.

In a second implementation manner, the SRC may first receive a paging message from one or more interfaces of a network standard, for example, receive a first paging message from an interface of a first network standard; the first network standard is the same as the network standard recorded in the paging management context of the UE, and therefore, the SRC can determine the paging range according to one or more of the paging management context of the UE, a historical record of the UE, an operator policy, and a location area identity carried in the first paging message, with no need to wait for another paging message to arrive.

If the first network standard is different from the network standard recorded in the paging management context of the UE, the SRC may first prepare a paging resource in the first network standard, for example, perform queuing in a paging queue. When a paging message for the UE has not been sent over an air interface, and the SRC receives a paging message for the UE from an interface of a second network standard same as the network standard recorded in the paging management context of the UE, the SRC releases the paging resource for the UE in the first network standard, for example, deletes the paging message for the UE from the paging queue; and determines the paging range according to one or more of the paging management context of the UE, the historical record of the UE, the operator policy, and the location area identity carried in the first paging message.

If the first network standard is different from the network standard recorded in the paging management context of the UE, the SRC may further enable a timer S and wait for a paging message that is for the UE and sent from the interface of the second network standard same as the network standard recorded in the paging management context of the UE. If the paging message for the UE is received from the interface of the second network standard before the timer S expires, the paging range is determined according to one or more of the paging management context of the UE, the historical record of the UE, the operator policy, and the location area identity carried in the first paging message.

In a third implementation manner, the paging message sent by the first network device carries activation indication information, where the activation indication information is used for indicating whether idle state signaling reduction ISR of the UE is activated. If a paging message received by the SRC carries the activation indication information, and the activation indication information is used for indicating that the ISR of the UE is activated, the SRC can determine the paging range according to one or more of the paging management context of the UE, a historical record of the UE, an operator policy, and a location area identity carried in the first paging message, with no need to wait for all paging messages to be received.

A specific process of initiating, by the SRC, paging on the UE in a cell in the paging range may be as follows: The SRC sends a paging message to a second network device corresponding to the cell in the paging range, and then the second network device pages the UE in the corresponding cell.

It should be noted that when the SRC receives multiple paging messages in total, in the foregoing implementation manner that the SRC first receives a paging message from an interface of a network standard same as the network standard recorded in the paging management context of the UE or a received paging message carries an indication message indicating that ISR of the UE is activated, the SRC may perform step 112 with no need to wait for all paging messages to be received, that is, step 111 and step 112 do not have a necessary time sequence relationship.

According to the mobility management method provided in this embodiment, an SRC receives a paging message sent by at least one first network device, where the paging message carries a user identifier used for indicating user equipment UE; determines a paging management context of the UE according to the user identifier in the paging message, where the paging management context of the UE records network standard information, and the network standard information is used for indicating a network standard on which the UE camps when switching to an idle state or a network standard to which the UE is redirected after switching to an idle state; and determines a paging range according to the paging message and the paging management context of the UE, and initiates paging on the UE in a cell in the paging range. The SRC may receive paging messages from interfaces of different network standards, and determine, according to the paging messages and the paging management context of the UE, a paging range in the network standard recorded in the paging management context of the UE, thereby implementing optimization on a paging process, and in particular, avoiding a waste of resources caused because when ISR of the UE is activated, first network devices in different network standards perform paging in all cells in a location area with which the UE registers. Therefore, a mobility management effect is improved.

Figure 4:
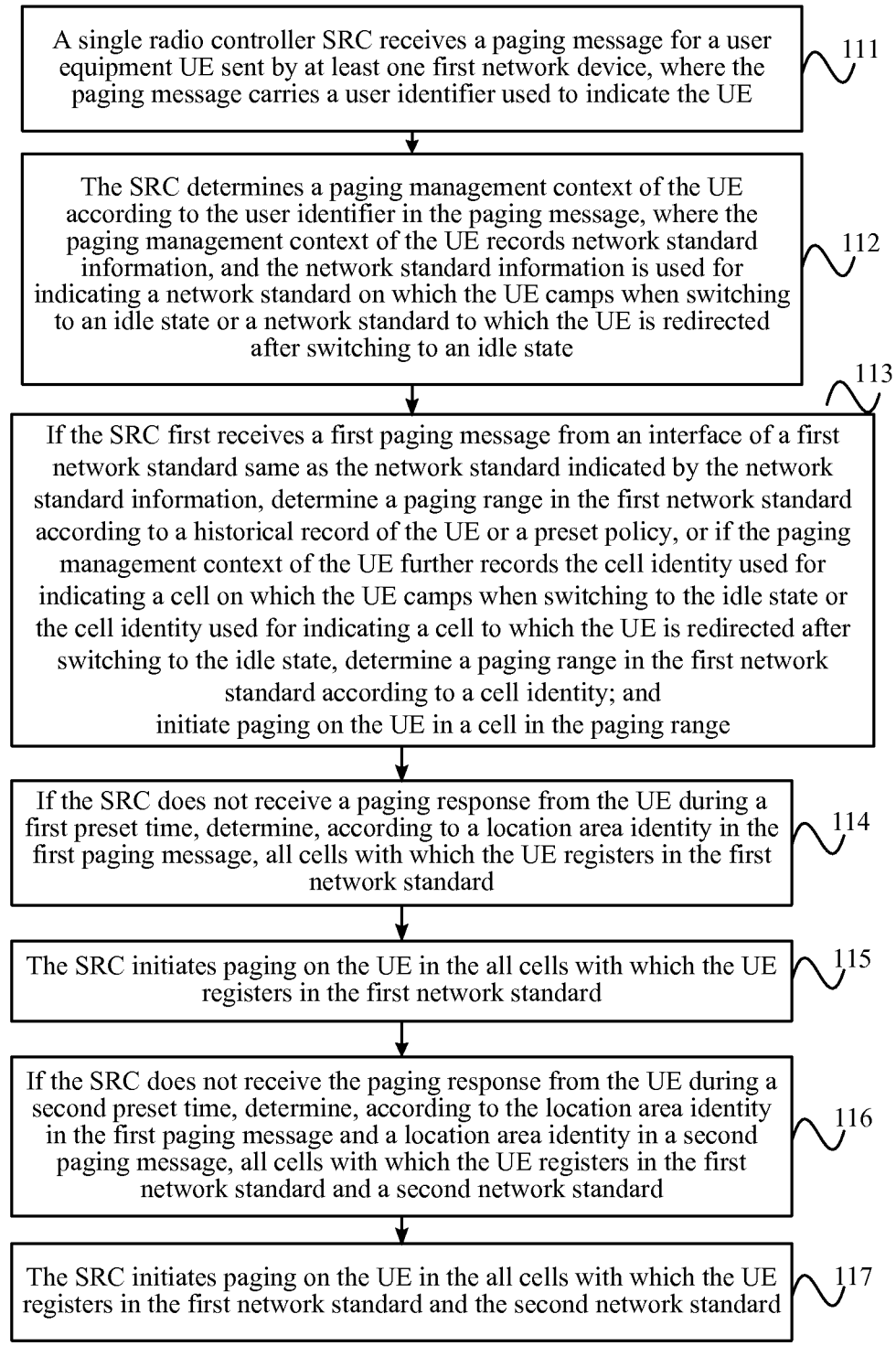
FIG. 4 is a flowchart of a second mobility management method according to an embodiment of the present invention.

FIG. 4 is a flowchart of a second mobility management method according to an embodiment of the present invention. As shown in FIG. 4, in this embodiment, the paging message received by the SRC includes a first paging message.

Step 113 that the SRC determines a paging range according to the paging message and the paging management context of the UE may specifically include:

if the SRC first receives the first paging message from an interface of a first network standard same as the network standard indicated by the network standard information, determining the paging range in the first network standard according to a historical record of the UE or a preset policy; or if the paging management context of the UE further records the cell identity used for indicating a cell on which the UE camps when switching to the idle state or the cell identity used for indicating a cell to which the UE is redirected after switching to the idle statedetermine the paging range in the first network standard, determining the paging range in the first network standard according to a cell identity.

In the first implementation manner, specifically, the SRC first receives the first paging message from the interface of the first network standard, where the first network standard is the network standard recorded in the paging management context of the UE, so that the SRC can determine the paging range in the first network standard according to one or more of the paging management context of the UE, the historical record of the UE, and the preset policy.

In this embodiment, the paging message carries a location area identity, and after the SRC initiates paging on the UE in the cell in the paging range, the method further includes:

Step 114: If the SRC does not receive a paging response from the UE during a first preset time, determine, according to a location area identity in the first paging message, all cells with which the UE registers in the first network standard.

Step 115: The SRC initiates paging on the UE in the all cells with which the UE registers in the first network standard.

Specifically, if the first network standard is a 2G/3G network, the location area identity in the first paging message is an RAI, and if the first network standard is an LTE network, the location area identity is a TAI list.

When the UE is not paged in the paging range in the first network standard, the paging range may further be extended, and therefore, the all cells with which the UE registers in the first network standard may be determined according to the location area identity in the first paging message, and then paging is initiated again on the UE.

In this embodiment, the paging message received by the SRC further includes a second paging message, and the first network standard to which the first paging message belongs is different from a second network standard to which the second paging message belongs; and after step 115 that the SRC initiates paging on the UE in the all cells with which the UE registers in the first network standard, the method further includes:

Step 116: If the SRC does not receive the paging response from the UE during a second preset time, determine, according to the location area identity in the first paging message and a location area identity in the second paging message, all cells with which the UE registers in the first network standard and a second network standard.

Step 117: The SRC initiates paging on the UE in the all cells with which the UE registers in the first network standard and the second network standard.

Specifically, after receiving the first paging message, the SRC receives the second paging message from an interface of the second network standard different from the first network standard.

When the UE is not paged in the all cells registered in the first network standard, the paging range may further be extended. The all cells with which the UE registers in the first network standard are determined according to the location area identity in the first paging message, the all cells with which the UE registers in the second network standard are determined according to the location area identity in the second paging message, and paging is initiated on the UE again.

By gradually extending the paging range, a waste of air interface resources caused because paging is performed on the UE in cells in all network standards at the beginning can be avoided.

In a practical application process, if the SRC first receives a paging message that is for the UE and sent by a first network device of a network standard, such as a network standard A, by using an interface of the network standard, the SRC finds the paging management context of the UE according to the user identifier of the UE. If a standard recorded in the paging management context of the UE is A, the SRC first pages the UE in the network standard A. The paging range may be a cell recorded in the paging management context of the UE or the cell and its surrounding cells, or may be a cell determined by the SRC according to the historical record of the UE and/or an operator policy. A timer M is enabled at the time of paging; if before the timer M expires, the SRC does not receive the paging response from the UE, and the SRC receives a paging message that is for the UE and sent from an interface of a network standard Y different from the network standard A, the SRC does not page the UE in the network standard Y; if the SRC still does not receive the paging response from the UE until the timer M expires, the SRC pages the UE in a cell in the network standard Y, and the paging range this time may further include a cell in the network standard A.

In this embodiment, the paging message carries a location area identity, the paging message received by the SRC includes a first paging message and a second paging message, and the paging management context of the UE further records a cell identity used for indicating a cell on which the UE camps when switching to the idle state or a cell identity used for indicating a cell to which the UE is redirected after switching to the idle state; and step 113 that the SRC determines a paging range according to the paging message and the paging management context of the UE may specifically include:

if the SRC first receives the first paging message from a first interface of a first network standard, the first network standard is the same as the network standard indicated by the network standard information, and the first interface is different from a second interface corresponding to the cell indicated by the cell identity, determining the paging range according to a location area identity in the first paging message, and preparing a paging resource according to the paging range; and if the second paging message is received from the second interface of the first network standard before paging is performed by using the paging resource, releasing the paging resource, and determining, according to one or more of the cell identity, a historical record of the UE, a preset policy, and a location area identity in the second paging message, the paging range in a cell of a second network device corresponding to the second interface; or if the SRC first receives the first paging message from a first interface of a first network standard, the first network standard is the same as the network standard indicated by the network standard information, the first interface is different from a second interface corresponding to the cell indicated by the cell identity, and the second paging message is received from the second interface of the first network standard during a third preset time, determining, according to one or more of the cell identity, a historical record of the UE, a preset policy, and a location area identity in the second paging message, the paging range in a cell of a second network device corresponding to the second interface; or if the SRC first receives the first paging message from a first interface of a first network standard, the first network standard is the same as the network standard indicated by the network standard information, and the first interface is the same as a second interface corresponding to the cell indicated by the cell identity, determining the paging range according to a location area identity in the first paging message, and paging the UE according to the paging range; and if the second paging message is received from a third interface of the first network standard during a fourth preset time, and the third interface is different from the second interface, after the fourth preset time elapses and when a paging response from the UE is not received, determining, according to one or more of the cell identity, a historical record of the UE, a preset policy, and location area identities in the first paging message and the second paging message, the paging range in a cell of a second network device corresponding to the first interface and the second interface.

Specifically, in a first implementation manner, when the first network device sends a paging message for the UE by using an interface of the first network standard recorded in the paging management context of the UE, but the interface does not belong to a second network device to which a cell recorded in the paging management context of the UE belongs, the paging range determined by the SRC may be a cell determined by the SRC according to a location area indicated by a location area identity carried in the paging message received from the interface of the first network standard.

If the SRC receives paging messages for a same UE from different interfaces of a same network standard, after determining a paging range according to one or more of a paging management context of the UE, a historical record of the UE, an operator policy, and a location area identity registered by the UE, the SRC first sends paging to a second network device to which a cell included in the paging range determined this time belongs.

When the UE is not paged in this paging range, the paging range may be extended; for a specific implementation process, reference may be made to the embodiment shown in FIG. 4, and details are not described herein again.

FIG. 5 is a flowchart of a third mobility management method according to an embodiment of the present invention. As shown in FIG. 5, in this embodiment, the paging message carries a location area identity, and the paging message received by the SRC includes a first paging message and a second paging message; and step 113 that the SRC determines a paging range according to the paging message and the paging management context of the UE includes:

if the SRC first receives the first paging message from an interface of a first network standard different from the network standard indicated by the network standard information, determining the paging range according to a location area identity in the first paging message, and preparing a paging resource according to the paging range; and if the second paging message is received, before paging is performed by using the paging resource, from an interface of a second network standard same as the network standard indicated by the network standard information, releasing the paging resource, and determining the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determining the paging range in the second network standard according to the cell identity; or if the SRC first receives the first paging message from an interface of a first network standard different from the network standard indicated by the network standard information, and receives the second paging message during a third preset time from an interface of a second network standard same as the network standard indicated by the network standard information, determining the paging range in the second network standard according to one or more of a historical record of the UE, a preset policy, and a location area identity in the second paging message; or if the SRC first receives the first paging message from an interface of a first network standard different from the network standard indicated by the network standard information, and the paging management context of the UE further records a cell identity used for indicating a cell on which the UE camps when switching to the idle state or a cell identity used for indicating a cell to which the UE is redirected after switching to the idle state, determining the paging range in the second network standard according to the cell identity.

In the second implementation manner, specifically, if the SRC first receives a paging message from the interface of the first network standard, where the first network standard is different from the network standard recorded in the paging management context of the UE, the SRC may first prepare a paging resource in the first network standard, for example, perform queuing in a paging queue. When a paging message for the UE has not been sent over an air interface, and the SRC receives a paging message for the UE from the interface of the second network standard same as the network standard recorded in the paging management context of the UE, the SRC releases the paging resource for the UE in the first network standard, for example, deletes the paging message for the UE from the paging queue; and determines the paging range according to one or more of the paging management context of the UE, the historical record of the UE, an operator policy, and the location area identity carried in the first paging message.

Alternatively, if the SRC first receives a paging message from the interface of the first network standard, where the first network standard is different from the network standard recorded in the paging management context of the UE, before the SRC pages the UE in a cell in the first network standard, the SRC may further enable a timer S and wait for a paging message that is for the UE and sent from the interface of the second network standard same as the network standard recorded in the paging management context of the UE. If the paging message for the UE is received from the interface of the second network standard before the timer S expires, the paging range is determined according to one or more of the paging management context of the UE, the historical record of the UE, an operator policy, and the location area identity carried in the first paging message.

In this embodiment, after step 113 that the SRC initiates paging on the UE in the cell in the paging range, the method further includes:

Step 124: If the SRC does not receive a paging response from the UE during a first preset time, determine, according to the location area identity in the second paging message, all cells with which the UE registers in the second network standard.

Step 125: The SRC initiates paging on the UE in the all cells with which the UE registers in the second network standard.

In this embodiment, after step 125 that the SRC initiates paging on the UE in the all cells with which the UE registers in the second network standard, the method further includes:

Step 126: If the SRC does not receive the paging response from the UE during a second preset time, determine, according to the location area identity in the first paging message and the location area identity in the second paging message, all cells with which the UE registers in the first network standard and the second network standard.

Step 127: The SRC initiates paging on the UE in the all cells with which the UE registers in the first network standard and the second network standard.

FIG. 6A, FIG. 6B and FIG. 6C are a flowchart of a fourth mobility management method according to an embodiment of the present invention. As shown in FIG. 6A, FIG. 6B and FIG. 6C, in this embodiment, the paging message carries activation indication information and a location area identity, and the paging message received by the SRC includes a first paging message and a second paging message; and step 113 that the SRC determines a paging range according to the paging message and the paging management context of the UE may specifically include:

if the SRC first receives the first paging message from an interface of a first network standard different from the network standard indicated by the network standard information, and activation indication information in the first paging message is used for indicating that idle state signaling reduction ISR of the UE is activated, preparing a paging resource according to a location area identity in the first paging message; and if the second paging message is received, before paging is performed by using the paging resource, from an interface of a second network standard same as the network standard indicated by the network standard information, releasing the paging resource, and determining the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determining the paging range in the second network standard according to the cell identity; or if the SRC first receives the first paging message from an interface of a first network standard different from the network standard indicated by the network standard information, activation indication information in the first paging message is used for indicating that ISR of the UE is activated, and the second paging message is received during a third preset time from an interface of a second network standard same as the network standard indicated by the network standard information, releasing a paging resource, and determining the paging range in the second network standard according to one or more of a historical record of the UE, a preset policy, and a location area identity in the second paging message; or if the SRC first receives the first paging message from an interface of a first network standard different from the network standard indicated by the network standard information, activation indication information in the first paging message is used for indicating that ISR of the UE is activated, and the paging management context of the UE further records a cell identity used for indicating a cell on which the UE camps when switching to the idle state or a cell identity used for indicating a cell to which the UE is redirected after switching to the idle state, determining the paging range in the second network standard according to the cell identity; or if the SRC first receives the first paging message from an interface of a first network standard different from the network standard indicated by the network standard information, and activation indication information in the first paging message is used for indicating that ISR of the UE is not activated, determining the paging range in the first network standard according to a location area identity in the first paging message.

In the third implementation manner, if a paging message received by the SRC carries ISR activation indication information, where the activation indication information is used for indicating whether the ISR of the UE is activated, the SRC may further determine the paging range according to the indication and one or more of the paging management context of the UE, the historical record of the UE, an operator policy, and the location area identity carried in the first paging message. Specifically, when the ISR of the UE is activated, if the SRC first receives a paging message from the interface of the first network standard, where the first network standard is different from the network standard recorded in the paging management context of the UE, before the SRC pages the UE in a cell in the first network standard, the SRC enables a timer S and waits for a paging message that is for the UE and sent from the interface of the second network standard same as the network standard recorded in the paging management context of the UE. If the paging message for the UE is received from the interface of the second network standard before the timer S expires, the paging range is determined according to one or more of the paging management context of the UE, the historical record of the UE, the operator policy, and the location area identity carried in the first paging message. If the SRC first receives a paging message from the interface of the first network standard, where the first network standard is different from the network standard recorded in the paging management context of the UE, the SRC may first prepare a paging resource in the first network standard, for example, perform queuing in a paging queue. When a paging message for the UE has not been sent over an air interface, and the SRC receives a paging message for the UE from the interface of the second network standard same as the network standard recorded in the paging management context of the UE, the SRC releases the paging resource for the UE in the first network standard, for example, deletes the paging message for the UE from the paging queue; and determines the paging range according to one or more of the paging management context of the UE, the historical record of the UE, the operator policy, and the location area identity carried in the first paging message. When the ISR of the UE is not activated, if the SRC first receives a paging message from the interface of the first network standard, where the first network standard is different from the network standard recorded in the paging management context of the UE, the SRC does not need to wait but determines the paging range in the first network standard directly according to the location area identity in the first paging message.

In this embodiment, after step 113 that the SRC initiates paging on the UE in the cell in the paging range, the method further includes:

Step 134: If the SRC does not receive a paging response from the UE during a first preset time, determine, according to the location area identity in the first paging message, all cells with which the UE registers in the first network standard.

Step 135: The SRC initiates paging on the UE in the all cells with which the UE registers in the first network standard.

In this embodiment, the first network standard to which the first paging message belongs is different from the second network standard to which the second paging message belongs; and after step 135 that the SRC initiates paging on the UE in the all cells with which the UE registers in the first network standard, the method further includes:

Step 136: If the SRC does not receive the paging response from the UE during a second preset time, determine, according to the location area identity in the first paging message and the location area identity in the second paging message, all cells with which the UE registers in the first network standard and the second network standard.

Step 137: The SRC initiates paging on the UE in the all cells with which the UE registers in the first network standard and the second network standard.

Figure 7:
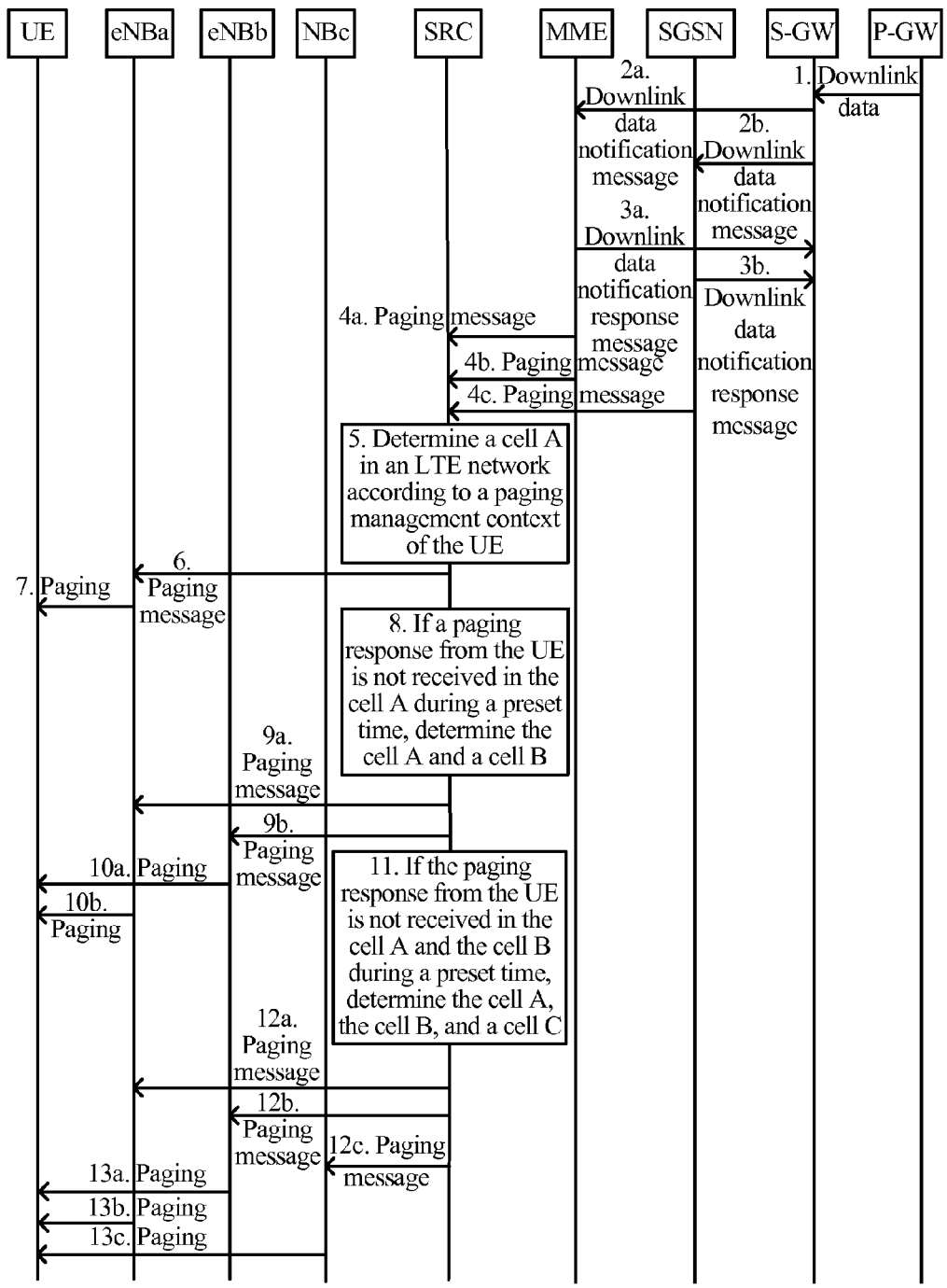
FIG. 7 is a signaling diagram of a first paging process according to an embodiment of the present invention.

FIG. 7 is a signaling diagram of a first paging process according to an embodiment of the present invention. With reference to FIG. 7, in the network architecture shown in FIG. 2, an example that UE camps on a cell A in an LTE network when being in an idle state is used to describe a paging process in the following, and a paging management context of the UE records the cell A in the LTE network.

Step 1: When downlink data (Downlink Data) of the UE arrives at a P-GW, the P-GW sends the downlink data to an S-GW.

Step 2a: The S-GW sends a downlink data notification message (Downlink Data Notification) to an MME.

Step 2b: The S-GW sends a downlink data notification message (Downlink Data Notification) to an SGSN.

Step 3a: The MME sends a downlink data notification acknowledgment message (Downlink Data Notification Ack) to the S-GW.

Step 3b: The SGSN sends a downlink data notification acknowledgment message (Downlink Data Notification Ack) to the S-GW.

Step 4a: The MME sends a paging message (Paging) to an SRC, where the paging message carries a cell identity in the LTE network with which the UE registers.

Step 4b: The MME sends a paging message (Paging) to the SRC, where the paging message carries a cell identity in the LTE network with which the UE registers.

Step 4c: The SGSN sends a paging message (Paging) to the SRC, where the paging message carries a cell identity in a 2G/3G network with which the UE registers.

Step 5: The SRC determines the cell A in the LTE network according to the paging management context of the UE.

Step 6: The SRC sends a paging message to an eNB a corresponding to the cell A in the LTE network.

Step 7: The eNB a pages the UE in the cell A.

Step 8: If a paging response from the UE is not received in the cell A during a preset time, determine all cells in the LTE network with which the UE registers, that is, the cell A and a cell B.

Step 9a: The SRC sends a paging message to the eNB a corresponding to the cell A in the LTE network.

Step 9b: The SRC sends a paging message to an eNB b corresponding to the cell B in the LTE network.

Step 10a: The eNB a pages the UE in the cell A.

Step 10b: The eNB b pages the UE in the cell B.

Step 11: If a paging response from the UE is not received in the cell A and the cell B during the preset time, determine all cells in the LTE network and the 2G/3G network with which the UE registers, that is, the cell A, the cell B, and a cell C.

Step 12a: The SRC sends a paging message to the eNB a corresponding to the cell A in the LTE network.

Step 12b: The SRC sends a paging message to the eNB b corresponding to the cell B in the LTE network.

Step 12c: The SRC sends a paging message to an NB c corresponding to the cell C in the LTE network.

Step 13a: The eNB a pages the UE in the cell A.

Step 13b: The eNB b pages the UE in the cell B.

Step 13c: The NB c pages the UE in the cell C.

It should be noted that there is no necessary time sequence relationship between step 2a and step 2b, between step 3a and step 3b, and between step 4a, step 4b, and step 4c. The SRC may trigger paging on the UE after receiving the foregoing three paging messages, or may prepare a paging resource for the UE after receiving one paging message.

Figure 8:
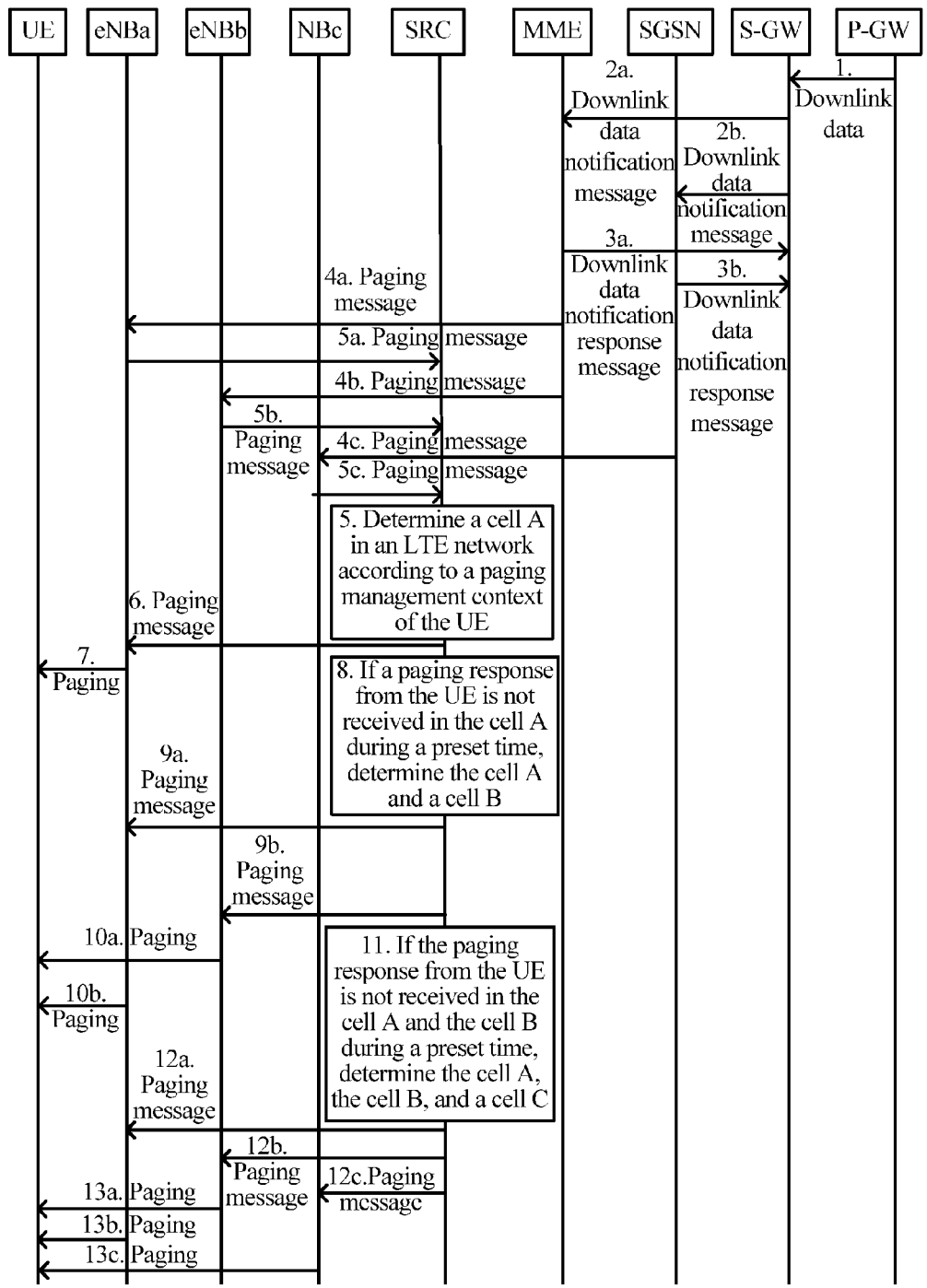
FIG. 8 is a signaling diagram of a second paging process according to an embodiment of the present invention.

FIG. 8 is a signaling diagram of a second paging process according to an embodiment of the present invention. With reference to FIG. 8, in the network architecture shown in FIG. 3, an example that UE camps on a cell A in an LTE network when being in an idle state is used to describe a paging process in the following, and a paging management context of the UE records the cell A in the LTE network.

Step 1: When downlink data (Downlink Data) of the UE arrives at a P-GW, the P-GW sends the downlink data to an S-GW.

Step 2a: The S-GW sends a downlink data notification message (Downlink Data Notification) to an MME.

Step 2b: The S-GW sends a downlink data notification message (Downlink Data Notification) to an SGSN.

Step 3a: The MME sends a downlink data notification acknowledgment message (Downlink Data Notification Ack) to the S-GW.

Step 3b: The SGSN sends a downlink data notification acknowledgment message (Downlink Data Notification Ack) to the S-GW.

Step 4a: The MME sends a paging message to an eNB a corresponding to a location area with which the UE registers, where the paging message carries a cell identity in the LTE network with which the UE registers.

Step 4b: The MME sends a paging message to an eNB b corresponding to a location area with which the UE registers, where the paging message carries a cell identity in the LTE network with which the UE registers.

Step 4c: The SGSN sends a paging message to an NB c corresponding to a location area with which the UE registers, where the paging message carries a cell identity in a 2G/3G network with which the UE registers.

Step 5a: The eNB a forwards the paging message to an SRC.

Step 5b: The eNB b forwards the paging message to the SRC.

Step 5c: The NB c forwards the paging message to the SRC.

Step 6: The SRC determines the cell A in the LTE network according to the paging management context of the UE.

Step 7: The SRC sends a paging message to the eNB a corresponding to the cell A in the LTE network.

Step 8: The eNB a pages the UE in the cell A.

Step 9: If a paging response from the UE is not received in the cell A during a preset time, determine all cells in the LTE network with which the UE registers, that is, the cell A and a cell B.

Step 10a: The SRC sends a paging message to the eNB a corresponding to the cell A in the LTE network.

Step 10b: The SRC sends a paging message to the eNB b corresponding to the cell B in the LTE network.

Step 11a: The eNB a pages the UE in the cell A.

Step 11b: The eNB b pages the UE in the cell B.

Step 12: If a paging response from the UE is not received in the cell A and the cell B during a preset time, determine all cells in the LTE network and the 2G/3G network with which the UE registers, that is, the cell A, the cell B, and a cell C.

Step 13a: The SRC sends a paging message to the eNB a corresponding to the cell A in the LTE network.

Step 13b: The SRC sends a paging message to the eNB b corresponding to the cell B in the LTE network.

Step 13c: The SRC sends a paging message to the NB c corresponding to the cell C in the LTE network.

Step 14a: The eNB a pages the UE in the cell A.

Step 14b: The eNB b pages the UE in the cell B.

Step 14c: The NB c pages the UE in the cell C.

It should be noted that there is no necessary time sequence relationship between step 2a and step 2b, between step 3a and step 3b, and between step 4a, step 4b, and step 4c, and that there is no necessary time sequence relationship between step 5a, step 5b, and step 5c.

Figure 9:
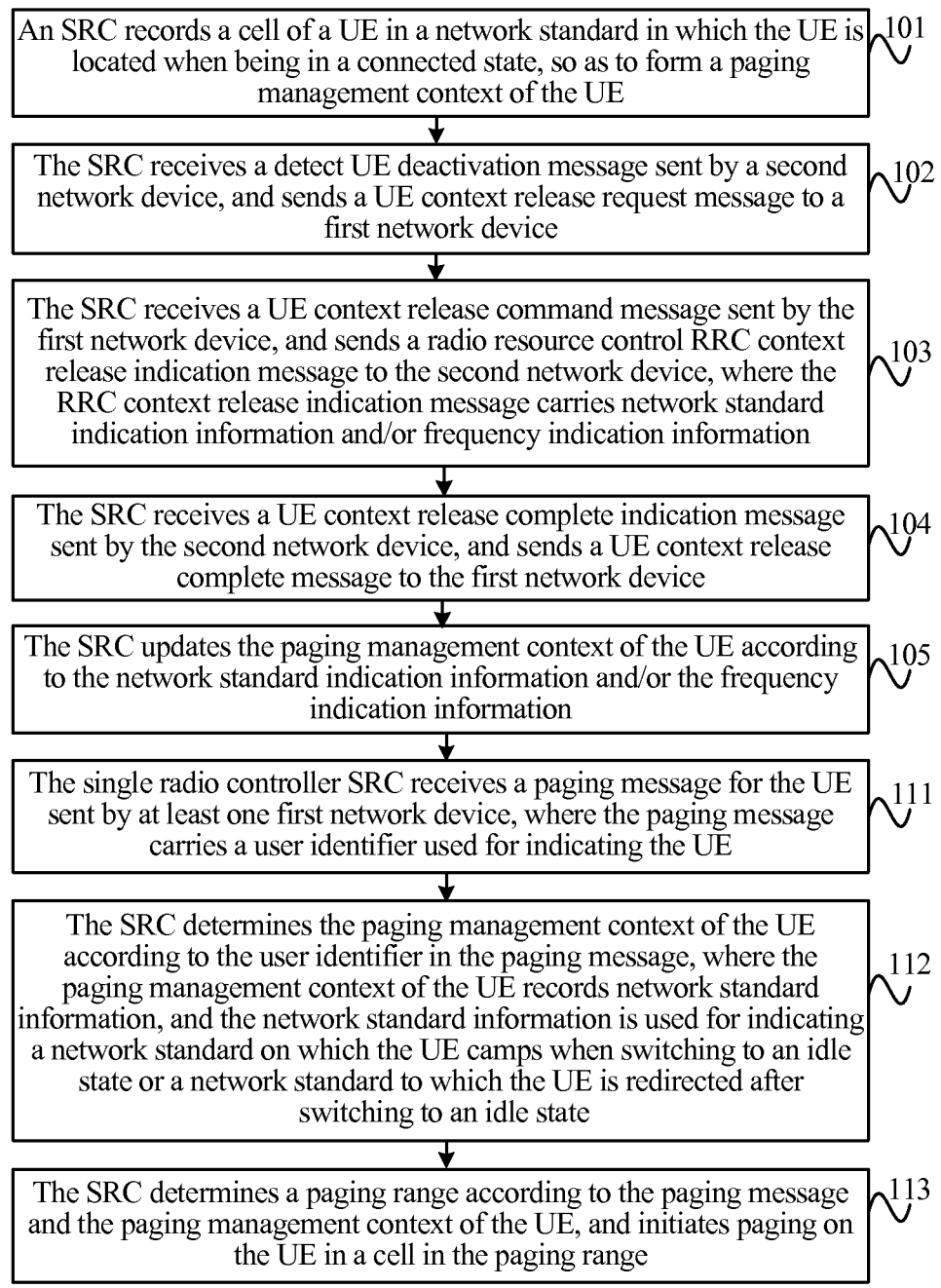
FIG. 9 is a flowchart of a fifth mobility management method according to an embodiment of the present invention.

FIG. 9 is a flowchart of a fifth mobility management method according to an embodiment of the present invention. As shown in FIG. 9, in this embodiment, before step 111 that an SRC receives a paging message for a user equipment UE sent by at least one first network device, the method may further include:

Step 101: The SRC records location information of the UE in a network standard in which the UE is located when being in a connected state, so as to form the paging management context of the UE.

Specifically, when the UE is in the connected state, the UE interacts with the SRC or interacts with the SRC by using a second network device, so that the SRC can learn of the network standard and a cell in which the UE is located. The SRC records the location information of the UE in the network standard in which the UE is located when being in the connected state, so as to form the paging management context of the UE, where the location information may be specifically a cell identity, a location area identity, or other information that can indicate a location of the UE. When the UE initiates a location update, the SRC also updates the paging management context according to the location update of the UE.

The paging management context of the UE may be generated or updated at a time point when the UE is in the connected state, or may be generated or updated in a processing process of switching to the idle state by the UE.

In this embodiment, before step 111 that an SRC receives a paging message for a user equipment UE sent by at least one first network device, the method may further include:

Step 102: The SRC receives a detect UE deactivation message sent by a second network device, and sends a UE context release request message to the first network device.

Step 103: The SRC receives a UE context release command message sent by the first network device, and sends a radio resource control RRC context release indication message to the second network device, where the RRC context release indication message carries network standard indication information and/or frequency indication information.

Step 104: The SRC receives a UE context release complete indication message sent by the second network device, and sends a UE context release complete message to the first network device.

Specifically, in the network architecture shown in FIG. 2 and in the processing process of switching to the idle state by the UE, the second network device communicates with the first network device by using the SRC. The RRC context release indication message sent by the SRC to the second network device may carry the network standard indication information and/or the frequency indication information. The SRC determines or the SRC and the second network device cooperate to determine one frequency of one network standard for the UE according to a coverage situation of another network standard at a location in which the connected-state UE is located, and a network resource condition, expecting that when being in the idle state, the UE can camp on the frequency that is of the network standard and indicated by the SRC.

After receiving the RRC context release indication message sent by the SRC, the second network device sends an RRC connection release message to the UE, where the RRC connection release message carries the network standard indication information and/or the frequency indication information. When the UE reselects the indicated network standard and frequency, if ISR of the UE is not activated, the UE initiates a location update in a cell that is of the network standard and controlled by the SRC, and the SRC may record or update the paging management context of the UE according to the location update initiated by the UE. If the ISR of the UE is activated, and a cell to which the UE is redirected is located in a location area that is in another network standard and with which the UE registers, the UE does not initiate a location update in a cell controlled by the SRC. Therefore, the SRC can update the paging management context of the UE according to the network standard indication information and the frequency indication information that indicate the UE.

According to the network standard indication information and/or the frequency indication information that are/is carried in the RRC connection release message sent by the SRC through the second network device to the UE, the SRC records, into the paging management context of the UE, a network standard and a cell that are corresponding to the network standard indication information and/or the frequency indication information. The recording may be performed when the UE switches to the idle state, or may be performed when paging is performed on the UE. If both interfaces receive the paging message sent by the first network device, it may be that both network standards perform paging in the recorded (or corresponding) cell or the cell and its surrounding cells. If the UE is located in a first network standard when switching to the idle state, and is located in a second network standard after being redirected, it may also be that after paging messages are received from interfaces of the first network standard and the second network standard, paging is performed at the first round in a cell in the first network standard when the UE switches to the idle state and in a cell that is of the second network standard and corresponding to a location of the UE. Apparently, the SRC records any change, in the network standard and the cell, of the UE when the UE is in the connected state.

Step 105: The SRC updates the paging management context of the UE according to the network standard indication information and/or the frequency indication information.

Figure 10:
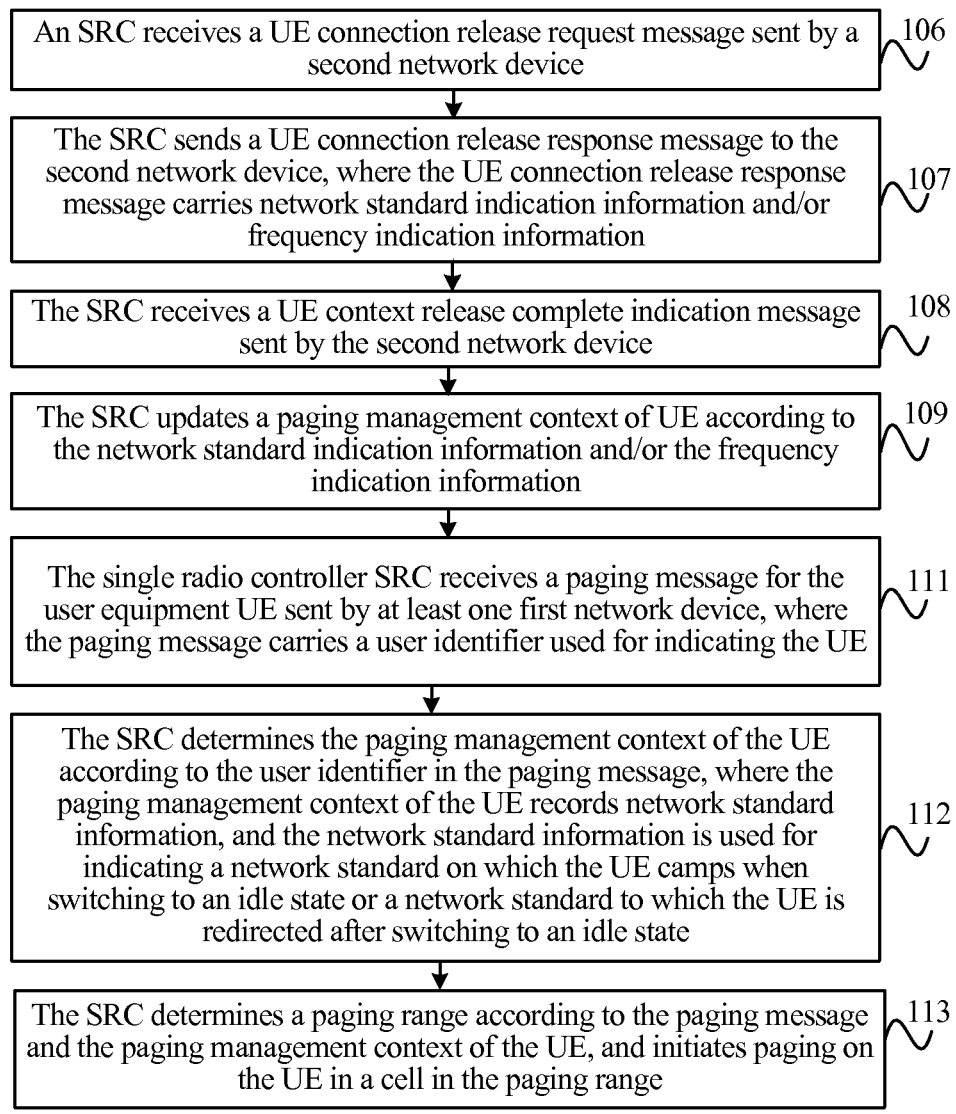
FIG. 10 is a flowchart of a sixth mobility management method according to an embodiment of the present invention.

FIG. 10 is a flowchart of a sixth mobility management method according to an embodiment of the present invention. As shown in FIG. 10, in this embodiment, in the network architecture shown in FIG. 3, the processing process of switching to the idle state by the UE may further include the following steps before step 111 that an SRC receives a paging message for a user equipment UE sent by at least one first network device:

Step 106: The SRC receives a UE connection release request message sent by a second network device.

Step 107: The SRC sends a UE connection release response message to the second network device, where the UE connection release response message carries network standard indication information and/or frequency indication information.

Step 108: The SRC receives a UE context release complete indication message sent by the second network device. In this embodiment, the method may further include:

Step 109: The SRC updates the paging management context of the UE according to the network standard indication information and/or the frequency indication information.

Figure 11:
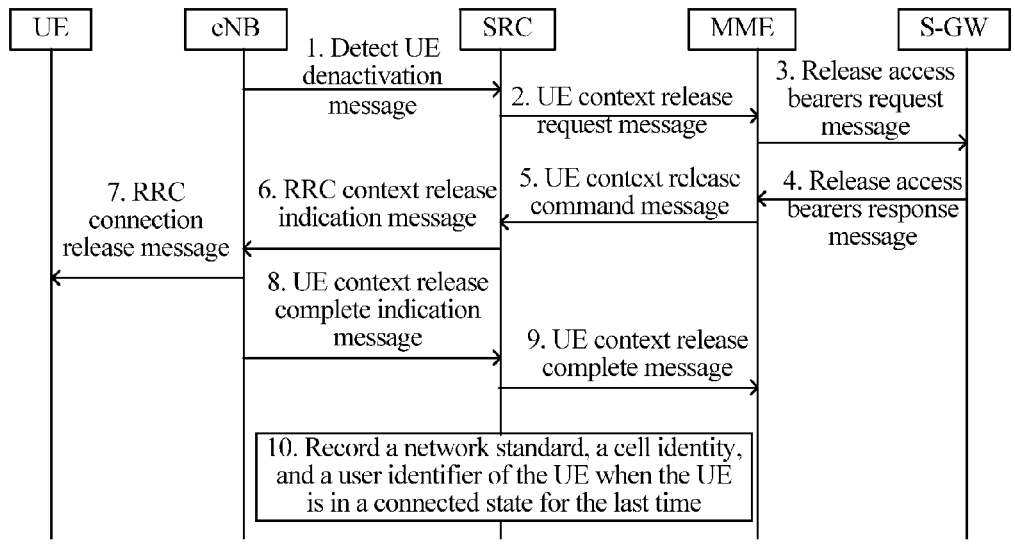
FIG. 11 is a signaling diagram of a first processing process of switching to an idle state by UE according to an embodiment of the present invention.

FIG. 11 is a signaling diagram of a first processing process of switching to an idle state by UE according to an embodiment of the present invention. With reference to FIG. 11, in the network architecture shown in FIG. 2, an example that the UE is in an LTE network before switching to the idle state is used to describe the processing process of switching to the idle state by the UE in the following.

Step 1: When the UE does not interact with an eNB for a long time, the eNB detects that the UE is deactivated, and the eNB sends a detect UE deactivation message (Detect UE inactivation) to an SRC.

Step 2: The SRC sends a UE context release request message (UE Context Release Request) to an MME.

Step 3: The MME sends a release access bearers request message (Release Access Bearers Request) to an S-GW.

Step 4: The S-GW sends a release access bearers response message (Release Access Bearers Response) to the MME.

Step 5: The MME sends a UE context release command message (UE Context Release Command) to the SRC.

Step 6: The SRC sends an RRC context release indication message (RRC Connection Release indication) to the eNB.

Step 7: The eNB sends an RRC connection release message (RRC Connection Release) to the UE.

Step 8: The eNB sends a UE context release complete indication message (UE Context Release Complete indication) to the SRC, where the UE context release complete indication message may carry location information of the UE in a cell, such as a cell identity of the cell when the UE switches to the idle state.

Step 9: The SRC sends a UE context release complete message (UE Context Release Complete) to the MME.

Step 10: The SRC records a network standard, a cell identity, and a user identifier of the UE when the UE is in a connected state for the last time.

Figure 12:
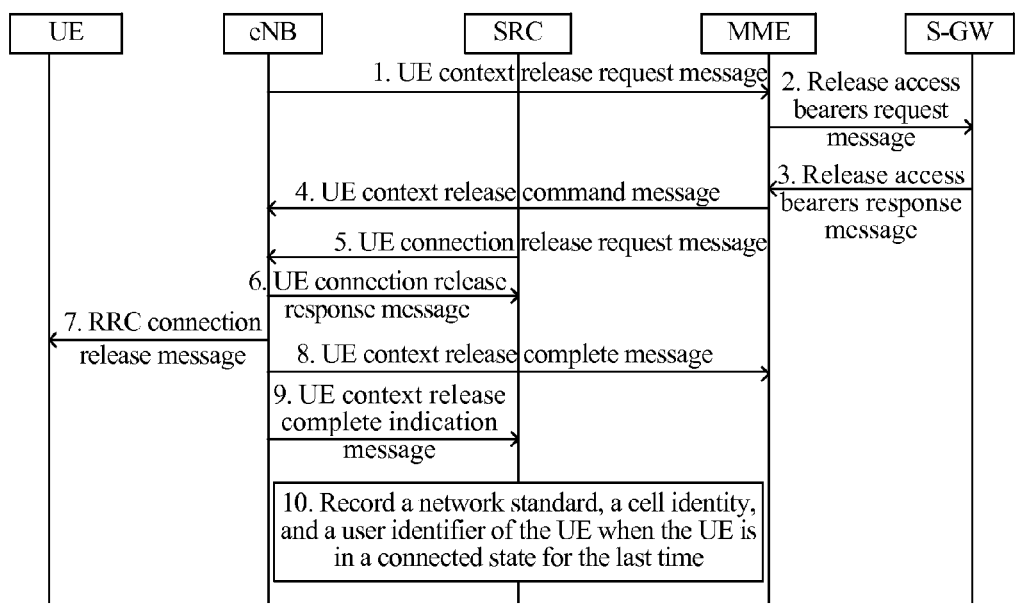
FIG. 12 is a signaling diagram of a second processing process of switching to an idle state by UE according to an embodiment of the present invention.

FIG. 12 is a signaling diagram of a second processing process of switching to an idle state by UE according to an embodiment of the present invention. With reference to FIG. 12, in the network architecture shown in FIG. 3, an example that the UE is in an LTE network before switching to the idle state is used to describe the processing process of switching to the idle state by the UE in the following.

Step 1: When the UE does not interact with an eNB for a long time, the eNB detects that the UE is deactivated, and the eNB sends a UE context release request message (UE Context Release Request) to an MME.

Step 2: The MME sends a release access bearers request message (Release Access Bearers Request) to an S-GW.

Step 3: The S-GW sends a release access bearers response message (Release Access Bearers Response) to the MME.

Step 4: The MME sends a UE context release command message (UE Context Release Command) to the eNB.

Step 5: The eNB sends a UE connection release request message (UE Connection Release Request) to an SRC.

Step 6: The SRC sends a UE connection release response message (UE Connection Release Response) to the eNB.

Step 7: The eNB sends an RRC connection release message (RRC Connection Release) to the UE.

Step 8: The eNB sends a UE context release complete message (UE Context Release Complete indication) to the MME.

Step 9: The eNB sends a UE context release complete indication message (UE Context Release Complete indication) to the SRC, where the UE context release complete indication message may carry a cell identity of a cell when the cell switches to the idle state.

Step 10: The SRC records location information and a user identifier of the UE in a cell, such as a network standard and a cell identity of the UE when the UE is in a connected state for the last time.

It should be noted that an example that the UE camps on an LTE network when being in the idle state is used for description in the embodiments shown in FIG. 7 and FIG. 8, and a paging process for the UE is similar when the UE camps on a 2G/3G network when being in the idle state. An example that the UE is in an LTE network before switching to the idle state is used to describe the processing process of switching to the idle state by the UE in the embodiments shown in FIG. 11 and FIG. 12; a processing process of switching to the idle state is similar when the UE is in a 2G network before switching to the idle state, as long as the eNB in FIG. 11 and FIG. 12 is replaced with a BSC; a processing process of switching to the idle state is also similar when the UE is in a 3G network before switching to the idle state, as long as the eNB in FIG. 11 and FIG. 12 is replaced with an RNC. Specific implementation processes are not described herein again.

Figure 13:
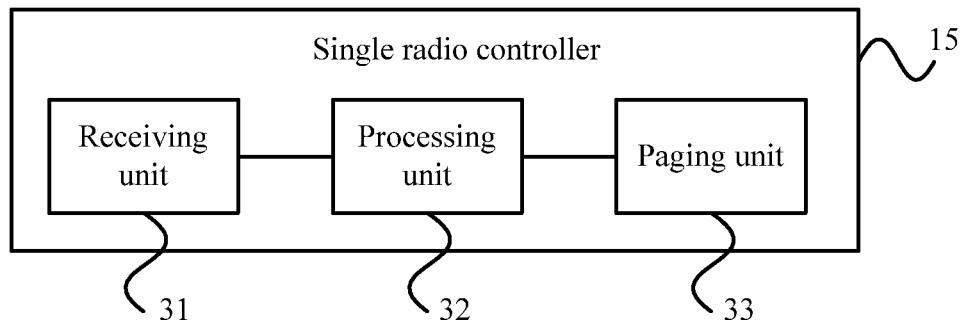
FIG. 13 is a schematic structural diagram of a first single radio controller according to an embodiment of the present invention.

FIG. 13 is a schematic structural diagram of a first single radio controller according to an embodiment of the present invention. As shown in FIG. 13, a single radio controller 15 provided in this embodiment may specifically implement each step of a mobility management method provided in any embodiment of the present invention, and a specific implementation process is not described herein again. The single radio controller 15 provided in this embodiment specifically includes:

a receiving unit 31, configured to receive a paging message for a user equipment UE sent by at least one first network device, where the paging message carries a user identifier used for indicating the UE;

a processing unit 32, configured to determine a paging management context of the UE according to the user identifier in the paging message received by the receiving unit 31, and determine a paging range according to the paging message and the paging management context of the UE, where the paging management context of the UE records network standard information, and the network standard information is used for indicating a network standard on which the UE camps when switching to an idle state or a network standard to which the UE is redirected after switching to an idle state; and a paging unit 33, configured to initiate paging on the UE in a cell in the paging range determined by the processing unit 32.

Specifically, the SRC is a newly added network element, and the SRC may centrally manage second network devices of different network standards in a same area. In this area, the SRC may manage one or more second network devices of a same network standard, each second network device has a corresponding first network device, and each first network device or second network device interacts with the SRC by using a respective interface. In an LTE network, the first network device is an MME, and the second network device is an eNB; in a 2G network, the first network device is an SGSN, and the second network device is a BSC; in a 3G network, the first network device is an SGSN, and the second network device is an RNC. In a practical implementation process, the SRC may also be integrated into the BSC and/or the RNC, or the SRC, the BSC, and the RNC may be integrated together.

In a network architecture, an SRC may be disposed between a first network device and a second network device, and the SRC is provided with interfaces for second network devices in different network standards in this area and interfaces for first network devices in the different network standards. In another network architecture, an SRC is not directly connected to a first network device, the SRC may be provided with interfaces for second network devices in different network standards in this area, and the second network devices may forward, to the SRC, signaling sent by first network devices.

In a practical application process, the user identifier is used for indicating the UE, and all interaction information between network elements in a network may carry the user identifier or a session of the interaction information is bound with the user identifier used for indicating an object served by the network. The user identifier may be specifically a permanent identity IMSI or a temporary identity S-TMSI, P-TMSI, or the like. It should be noted that when the UE is in a connected state, the SRC may receive a permanent identity IMSI of the UE from signaling by using an Iu interface in a 3G network standard; on a Gb interface in a 2G network standard, the first network device may be configured so as to send the permanent identity IMSI of the UE by using signaling on the Gb interface, and the SRC may also obtain the IMSI of the UE; in an LTE network standard, the first network device does not send the IMSI of the UE to an access network by using an S1 interface.

Therefore, before the UE switches to the idle state, if the UE is in the 2G/3G network standard, the paging management context of the UE records the permanent identity IMSI; if the UE is in the LTE network standard, the paging management context of the UE may record only the temporary identity S-TMSI. For a UE that is handed over from a cell that is in the 2G/3G network standard and controlled by the SRC to a cell in the LTE network standard, and then switches to the idle state, the SRC may also identify a permanent identity IMSI of the UE and record the IMSI into a paging management context of the UE.

In the 2G/3G/LTE network standard, a paging message sent by the first network device to the SRC carries the permanent identity IMSI and temporary identities P-TMSI and S-TMSI of the UE. Therefore, after receiving paging messages that are for the UE that is in the 2G/3G network standard before switching to the idle state and are sent from interfaces of different network standards, the SRC can find the paging management context of the UE according to the permanent identity IMSI of the UE. If the paging management context of the UE does not record the IMSI of the UE (when the UE is in the LTE network standard before switching to the idle state), the SRC can determine the paging management context of the UE only after receiving a paging message for the UE from an interface that is in the LTE network standard and for the first network device. If the paging management context of the UE records the IMSI of the UE (the UE is handed over from a cell in the 2G/3G network standard of the SRC to a cell in the LTE network standard, or the interface that is in the LTE network standard and for the first network device includes the IMSI into connected-state signaling), after receiving paging messages that are for the UE that is in the 2G/3G network standard before switching to the idle state and are sent from interfaces of different network standards, the SRC can find the paging management context of the UE according to the permanent identity IMSI of the UE. The paging management context of the UE further records the network standard information used for indicating the network standard on which the UE camps when switching to the idle state or the network standard to which the UE is redirected after switching to the idle state, and the paging management context of the UE further records a cell identity used for indicating a cell. If a message delivered by the SRC does not indicate a network standard and a frequency and/or a cell, a cell of the network standard on which the UE camps and recorded in the paging management context of the UE is a cell in which the UE is located when being in the connected state for the last time before switching to the idle state. If the message delivered by the SRC indicates a network standard and a frequency and/or a cell, and ISR of the UE is activated, the UE enters the indicated network standard and frequency and/or cell after switching to the idle state, and does not initiate a location update; therefore, the cell of the network standard on which the UE camps and recorded in the paging management context of the UE is the indicated network standard and frequency and/or cell.

After the UE switches to the idle state, downlink data of the UE arrives at a P-GW, the P-GW sends the downlink data to an S-GW, the S-GW separately sends a downlink data notification message to an MME and an SGSN, and the MME and the SGSN separately send a paging message to the SRC; or the MME sends a paging message to an eNB, the SGSN sends a paging message to a BSC/RNC, and the eNB/BSC/RNC do not perform direct paging but forward the paging messages to the SRC. The SRC may receive a paging message from one or more interfaces of different network standards, and the SRC determines a paging range according to a network standard of the received paging message and the network standard recorded in the paging management context of the UE, where the paging range includes one or more cells that are in a coverage of the SRC and in a first network standard recorded in the paging management context of the UE.

There may be multiple implementation manners of determining, by the SRC, the paging range according to the paging message and the paging management context of the UE.

In a first implementation manner, the SRC may receive a paging message from one or more interfaces of different network standards in a relatively short time, where if one of the different network standards is the first network standard recorded in the paging management context of the UE, paging may be first performed on the UE in the first network standard. The paging range may be a cell recorded in the paging management context of the UE or the cell and its surrounding cells.

The SRC may further record in advance a network standard and a cell on which the UE camps in a past preset period of time, so as to form a historical record of the UE, and therefore, the paging range may be a cell that is in the first network standard and that is determined by the SRC according to the historical record of the UE. The SRC may further determine a cell in the first network standard according to an operator policy, and the operator policy may be specifically a policy preset by an operator. For example, when a cell on which the UE camps before switching to the idle state and recorded in the paging management context of the UE is a railway station, it is considered that a user may enter a transport vehicle such as a train and move along a line, and therefore, the paging range may be a cell along this line.

The paging message sent by the first network device carries a location area identity, where the location area identity is used for indicating a location area with which the UE has registered. For example, in a 2G/3G network, the UE registers an RAI in an SGSN; or in an LTE network, the UE registers a TAI list in an MME. The location area identity may be a routing area identity or a tracking area identity list. Therefore, the paging range may be a cell determined by the SRC according to a location area indicated by a location area identity carried in a paging message that is received from an interface of the first network standard.

In a second implementation manner, the SRC may first receive a paging message from one or more interfaces of a network standard, for example, receive a first paging message from an interface of a first network standard; the first network standard is the same as the network standard recorded in the paging management context of the UE, and therefore, the SRC can determine the paging range according to one or more of the paging management context of the UE, a historical record of the UE, an operator policy, and a location area identity carried in the first paging message, with no need to wait for another paging message to arrive.

If the first network standard is different from the network standard recorded in the paging management context of the UE, the SRC may first prepare a paging resource in the first network standard, for example, perform queuing in a paging queue. When a paging message for the UE has not been sent over an air interface, and the SRC receives a paging message for the UE from an interface of a second network standard same as the network standard recorded in the paging management context of the UE, the SRC releases the paging resource for the UE in the first network standard, for example, deletes the paging message for the UE from the paging queue; and determines the paging range according to one or more of the paging management context of the UE, the historical record of the UE, the operator policy, and the location area identity carried in the first paging message.

If the first network standard is different from the network standard recorded in the paging management context of the UE, the SRC may further enable a timer S and wait for a paging message that is for the UE and sent from the interface of the second network standard same as the network standard recorded in the paging management context of the UE.

If the paging message for the UE is received from the interface of the second network standard before the timer S expires, the paging range is determined according to one or more of the paging management context of the UE, the historical record of the UE, the operator policy, and the location area identity carried in the first paging message.

In a third implementation manner, the paging message sent by the first network device carries activation indication information, where the activation indication information is used for indicating whether idle state signaling reduction ISR of the UE is activated. If a paging message received by the SRC carries the activation indication information, and the activation indication information is used for indicating that the ISR of the UE is activated, the SRC can determine the paging range according to one or more of the paging management context of the UE, a historical record of the UE, an operator policy, and a location area identity carried in the first paging message, with no need to wait for all paging messages to be received.

A specific process of initiating, by the SRC, paging on the UE in a cell in the paging range may be as follows: The SRC sends a paging message to a second network device corresponding to the cell in the paging range, and then the second network device pages the UE in the corresponding cell.

According to the single radio controller SRC provided in this embodiment, the SRC may receive paging messages from interfaces of different network standards, and determine, according to the paging messages and a paging management context of the UE, a paging range in a network standard recorded in the paging management context of the UE, thereby implementing optimization on a paging process, and in particular, avoiding a waste of resources caused because when ISR of the UE is activated, first network devices in different network standards perform paging in all cells in a location area with which the UE registers. Therefore, a mobility management effect is improved.

In this embodiment, the paging message received by the SRC includes a first paging message; and the processing unit 32 is specifically configured to, if a first paging message is first received from an interface of a first network standard same as the network standard indicated by the network standard information, determine the paging range in the first network standard according to a historical record of the UE or a preset policy, or if the paging management context of the UE further records the cell identity used for indicating a cell on which the UE camps when switching to the idle state or the cell identity used for indicating a cell to which the UE is redirected after switching to the idle state, determine the paging range in the first network standard according to a cell identity.

In this embodiment, the paging message carries a location area identity;

the processing unit 32 is further configured to, if a paging response from the UE is not received during a first preset time, determine, according to a location area identity in the first paging message, all cells with which the UE registers in the first network standard; and the paging unit 33 is further configured to initiate paging on the UE in the all cells with which the UE registers in the first network standard.

In this embodiment, the paging message received by the SRC further includes a second paging message, and the first network standard to which the first paging message belongs is different from a second network standard to which the second paging message belongs;

the processing unit 32 is further configured to, if the paging response from the UE is not received during a second preset time, determine, according to the location area identity in the first paging message and a location area identity in the second paging message, all cells with which the UE registers in the first network standard and the second network standard; and the paging unit 33 is further configured to initiate paging on the UE in the all cells with which the UE registers in the first network standard and the second network standard.

In this embodiment, the paging message carries a location area identity, the paging message received by the SRC includes a first paging message and a second paging message, and the paging management context of the UE further records a cell identity used for indicating a cell on which the UE camps when switching to the idle state or a cell identity used for indicating a cell to which the UE is redirected after switching to the idle state; and the processing unit 32 is specifically configured to, if the first paging message is first received from a first interface of a first network standard, the first network standard is the same as the network standard indicated by the network standard information, and the first interface is different from a second interface corresponding to the cell indicated by the cell identity, determine the paging range according to a location area identity in the first paging message, and prepare a paging resource according to the paging range; and if the second paging message is received from the second interface of the first network standard before paging is performed by using the paging resource, release the paging resource, and determine, according to one or more of the cell identity, a historical record of the UE, a preset policy, and a location area identity in the second paging message, the paging range in a cell of a second network device corresponding to the second interface; or if the first paging message is first received from a first interface of a first network standard, the first network standard is the same as the network standard indicated by the network standard information, the first interface is different from a second interface corresponding to the cell indicated by the cell identity, and the second paging message is received from the second interface of the first network standard during a third preset time, determine, according to one or more of the cell identity, a historical record of the UE, a preset policy, and a location area identity in the second paging message, the paging range in a cell of a second network device corresponding to the second interface; or if the first paging message is first received from a first interface of a first network standard, the first network standard is the same as the network standard indicated by the network standard information, and the first interface is the same as a second interface corresponding to the cell indicated by the cell identity, determine the paging range according to a location area identity in the first paging message, and page the UE according to the paging range; and if the second paging message is received from a third interface of the first network standard during a fourth preset time, and the third interface is different from the second interface, after the fourth preset time elapses and when a paging response from the UE is not received, determine, according to one or more of the cell identity, a historical record of the UE, a preset policy, and location area identities in the first paging message and the second paging message, the paging range in a cell of a second network device corresponding to the first interface and the second interface.

In this embodiment, the paging message carries a location area identity, and the paging message received by the SRC includes a first paging message and a second paging message; and the processing unit 32 is specifically configured to, if the first paging message is first received from an interface of a first network standard different from the network standard indicated by the network standard information, determine the paging range according to a location area identity in the first paging message, and prepare a paging resource according to the paging range; and if the second paging message is received, before paging is performed by using the paging resource, from an interface of a second network standard same as the network standard indicated by the network standard information, release the paging resource, and determine the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, and the second paging message is received during a third preset time from an interface of a second network standard same as the network standard indicated by the network standard information, determine the paging range in the second network standard according to one or more of a historical record of the UE, a preset policy, and a location area identity in the second paging message; or if the first paging message is first received from an interface of a first network standard different from the network standard indicated by the network standard information, and the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity.

In this embodiment, the processing unit 32 is further configured to, if a paging response from the UE is not received during a first preset time, determine, according to the location area identity in the second paging message, all cells with which the UE registers in the second network standard; and the paging unit 33 is further configured to initiate paging on the UE in the all cells with which the UE registers in the second network standard.

In this embodiment, the processing unit 32 is further configured to, if the paging response from the UE is not received during a second preset time, determine, according to the location area identity in the first paging message and the location area identity in the second paging message, all cells with which the UE registers in the first network standard and the second network standard; and the paging unit 33 is further configured to initiate paging on the UE in the all cells with which the UE registers in the first network standard and the second network standard.

In this embodiment, the paging message carries activation indication information and a location area identity, and the paging message received by the SRC includes a first paging message and a second paging message; and the processing unit 32 is specifically configured to, if the first paging message is first received from an interface of a first network standard different from the network standard indicated by the network standard information, and activation indication information in the first paging message is used for indicating that idle state signaling reduction ISR of the UE is activated, prepare a paging resource according to a location area identity in the first paging message; and if the second paging message is received, before paging is performed by using the paging resource, from an interface of a second network standard same as the network standard indicated by the network standard information, release the paging resource, and determine the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, activation indication information in the first paging message is used for indicating that ISR of the UE is activated, and the second paging message is received during a third preset time from an interface of a second network standard same as the network standard indicated by the network standard information, release a paging resource, and determine the paging range in the second network standard according to one or more of a historical record of the UE, a preset policy, and a location area identity in the second paging message; or if the first paging message is first received from an interface of a first network standard different from the network standard indicated by the network standard information, activation indication information in the first paging message is used for indicating that ISR of the UE is activated, and the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, and activation indication information in the first paging message is used for indicating that ISR of the UE is not activated, determine the paging range in the first network standard according to a location area identity in the first paging message.

In this embodiment, the processing unit 32 is further configured to, if a paging response from the UE is not received during a first preset time, determine, according to the location area identity in the first paging message, all cells with which the UE registers in the first network standard; and the paging unit 33 is further configured to initiate paging on the UE in the all cells with which the UE registers in the first network standard.

In this embodiment, the first network standard to which the first paging message belongs is different from the second network standard to which the second paging message belongs; and the processing unit 32 is further configured to, if the paging response from the UE is not received during a second preset time, determine, according to the location area identity in the first paging message and the location area identity in the second paging message, all cells with which the UE registers in the first network standard and the second network standard; and the paging unit 33 is further configured to initiate paging on the UE in the all cells with which the UE registers in the first network standard and the second network standard.

Figure 14:
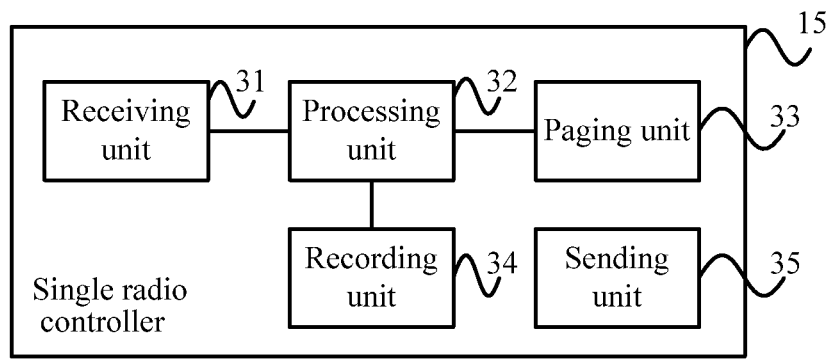
FIG. 14 is a schematic structural diagram of a second single radio controller according to an embodiment of the present invention.

FIG. 14 is a schematic structural diagram of a second single radio controller according to an embodiment of the present invention. As shown in FIG. 14, in this embodiment, the single radio controller 15 may further include:

a recording unit 34, connected to the processing unit 32 and configured to record location information of the UE in a network standard in which the UE is located when being in a connected state, so as to form the paging management context of the UE.

In this embodiment, the receiving unit 31 is further configured to receive a detect UE deactivation message sent by a second network device; receive a UE context release command message sent by the first network device; and receive a UE context release complete indication message sent by the second network device; and the single radio controller 15 further includes:

a sending unit 35, configured to send a UE context release request message to the first network device; send a radio resource control RRC context release indication message to the second network device, where the RRC context release indication message carries network standard indication information and/or frequency indication information; and send a UE context release complete message to the first network device.

In this embodiment, the receiving unit 31 is further configured to receive a UE connection release request message sent by a second network device; and receive a UE context release complete indication message sent by the second network device; and the single radio controller 15 further includes:

a sending unit 35, configured to send a UE connection release response message to the second network device, where the UE connection release response message carries network standard indication information and/or frequency indication information.

In this embodiment, the recording unit 34 is further configured to update the paging management context of the UE according to the network standard indication information and/or the frequency indication information.

Figure 15:
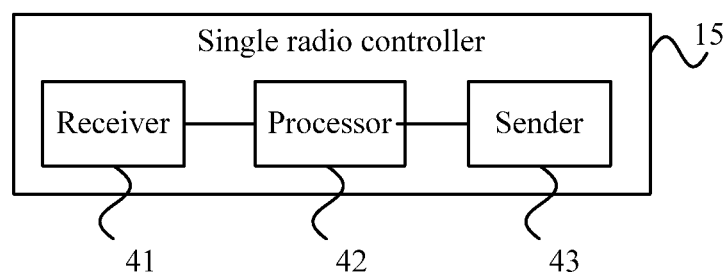
FIG. 15 is a schematic structural diagram of a third single radio controller according to an embodiment of the present invention.

FIG. 15 is a schematic structural diagram of a third single radio controller according to an embodiment of the present invention. As shown in FIG. 15, a single radio controller 15 provided in this embodiment specifically includes:

a receiver 41, configured to receive a paging message for a user equipment UE sent by at least one first network device, where the paging message carries a user identifier used for indicating the UE;

a processor 42, configured to determine a paging management context of the UE according to the user identifier in the paging message received by the receiver 41, and determine a paging range according to the paging message and the paging management context of the UE, where the paging management context of the UE records network standard information, and the network standard information is used for indicating a network standard on which the UE camps when switching to an idle state or a network standard to which the UE is redirected after switching to an idle state; and a sender 43, configured to initiate paging on the UE in a cell in the paging range determined by the processor 42.

In this embodiment, the paging message received by the SRC includes a first paging message; and the processor 42 is specifically configured to, if a first paging message is first received from an interface of a first network standard same as the network standard indicated by the network standard information, determine the paging range in the first network standard according to a historical record of the UE or a preset policy, or if the paging management context of the UE further records the cell identity used for indicating a cell on which the UE camps when switching to the idle state or the cell identity used for indicating a cell to which the UE is redirected after switching to the idle state, determine the paging range in the first network standard according to a cell identity.

In this embodiment, the paging message carries a location area identity;

the processor 42 is further configured to, if a paging response from the UE is not received during a first preset time, determine, according to a location area identity in the first paging message, all cells with which the UE registers in the first network standard; and the sender 43 is further configured to initiate paging on the UE in the all cells with which the UE registers in the first network standard.

In this embodiment, the paging message received by the SRC further includes a second paging message, and the first network standard to which the first paging message belongs is different from a second network standard to which the second paging message belongs;

the processor 42 is further configured to, if the paging response from the UE is not received during a second preset time, determine, according to the location area identity in the first paging message and a location area identity in the second paging message, all cells with which the UE registers in the first network standard and the second network standard; and the sender 43 is further configured to initiate paging on the UE in the all cells with which the UE registers in the first network standard and the second network standard.

In this embodiment, the paging message carries a location area identity, the paging message received by the SRC includes a first paging message and a second paging message, and the paging management context of the UE further records a cell identity used for indicating a cell on which the UE camps when switching to the idle state or a cell identity used for indicating a cell to which the UE is redirected after switching to the idle state; and the processor 42 is configured to, if the first paging message is first received from a first interface of a first network standard, the first network standard is the same as the network standard indicated by the network standard information, and the first interface is different from a second interface corresponding to the cell indicated by the cell identity, determine the paging range according to a location area identity in the first paging message, and prepare a paging resource according to the paging range; and if the second paging message is received from the second interface of the first network standard before paging is performed by using the paging resource, release the paging resource, and determine, according to one or more of the cell identity, a historical record of the UE, a preset policy, and a location area identity in the second paging message, the paging range in a cell of a second network device corresponding to the second interface; or if the first paging message is first received from a first interface of a first network standard, the first network standard is the same as the network standard indicated by the network standard information, the first interface is different from a second interface corresponding to the cell indicated by the cell identity, and the second paging message is received from the second interface of the first network standard during a third preset time, determine, according to one or more of the cell identity, a historical record of the UE, a preset policy, and a location area identity in the second paging message, the paging range in a cell of a second network device corresponding to the second interface; or if the first paging message is first received from a first interface of a first network standard, the first network standard is the same as the network standard indicated by the network standard information, and the first interface is the same as a second interface corresponding to the cell indicated by the cell identity, determine the paging range according to a location area identity in the first paging message, and page the UE according to the paging range; and if the second paging message is received from a third interface of the first network standard during a fourth preset time, and the third interface is different from the second interface, after the fourth preset time elapses and when a paging response from the UE is not received, determine, according to one or more of the cell identity, a historical record of the UE, a preset policy, and location area identities in the first paging message and the second paging message, the paging range in a cell of a second network device corresponding to the first interface and the second interface.

In this embodiment, the paging message carries a location area identity, and the paging message received by the SRC includes a first paging message and a second paging message; and the processor 42 is specifically configured to, if the first paging message is first received from an interface of a first network standard different from the network standard indicated by the network standard information, determine the paging range according to a location area identity in the first paging message, and prepare a paging resource according to the paging range; and if the second paging message is received, before paging is performed by using the paging resource, from an interface of a second network standard same as the network standard indicated by the network standard information, release the paging resource, and determine the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, and the second paging message is received during a third preset time from an interface of a second network standard same as the network standard indicated by the network standard information, determine the paging range in the second network standard according to one or more of a historical record of the UE, a preset policy, and a location area identity in the second paging message; or if the first paging message is first received from an interface of a first network standard different from the network standard indicated by the network standard information, and the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity.

In this embodiment, the processor 42 is further configured to, if a paging response from the UE is not received during a first preset time, determine, according to the location area identity in the second paging message, all cells with which the UE registers in the second network standard; and the sender 43 is further configured to initiate paging on the UE in the all cells with which the UE registers in the second network standard.

In this embodiment, the processor 42 is further configured to, if the paging response from the UE is not received during a second preset time, determine, according to the location area identity in the first paging message and the location area identity in the second paging message, all cells with which the UE registers in the first network standard and the second network standard; and the sender 43 is further configured to initiate paging on the UE in the all cells with which the UE registers in the first network standard and the second network standard.

In this embodiment, the paging message carries activation indication information and a location area identity, and the paging message received by the SRC includes a first paging message and a second paging message; and the processor 42 is specifically configured to, if the first paging message is first received from an interface of a first network standard different from the network standard indicated by the network standard information, and activation indication information in the first paging message is used for indicating that idle state signaling reduction ISR of the UE is activated, prepare a paging resource according to a location area identity in the first paging message; and if the second paging message is received, before paging is performed by using the paging resource, from an interface of a second network standard same as the network standard indicated by the network standard information, release the paging resource, and determine the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, activation indication information in the first paging message is used for indicating that ISR of the UE is activated, and the second paging message is received during a third preset time from an interface of a second network standard same as the network standard indicated by the network standard information, release a paging resource, and determine the paging range in the second network standard according to one or more of a historical record of the UE, a preset policy, and a location area identity in the second paging message; or if the first paging message is first received from an interface of a first network standard different from the network standard indicated by the network standard information, activation indication information in the first paging message is used for indicating that ISR of the UE is activated, and the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or if the first paging message is first received from an interface of a first network standard different from the network standard indicated by the network standard information, and activation indication information in the first paging message is used for indicating that ISR of the UE is not activated, determine the paging range in the first network standard according to a location area identity in the first paging message.

In this embodiment, the processor 42 is further configured to, if a paging response from the UE is not received during a first preset time, determine, according to the location area identity in the first paging message, all cells with which the UE registers in the first network standard; and the sender 43 is further configured to initiate paging on the UE in the all cells with which the UE registers in the first network standard.

In this embodiment, the first network standard to which the first paging message belongs is different from the second network standard to which the second paging message belongs;

the processor 42 is further configured to, if the paging response from the UE is not received during a second preset time, determine, according to the location area identity in the first paging message and the location area identity in the second paging message, all cells with which the UE registers in the first network standard and the second network standard; and the sender 43 is further configured to initiate paging on the UE in the all cells with which the UE registers in the first network standard and the second network standard.

In this embodiment, the processor 42 is further configured to record location information of the UE in a network standard in which the UE is located when being in a connected state, so as to form the paging management context of the UE.

In this embodiment, the receiver 41 is further configured to receive a detect UE deactivation message sent by a second network device; receive a UE context release command message sent by the first network device; and receive a UE context release complete indication message sent by the second network device; and the sender 43 is further configured to send a UE context release request message to the first network device; send a radio resource control RRC context release indication message to the second network device, where the RRC context release indication message carries network standard indication information and/or frequency indication information; and send a UE context release complete message to the first network device.

In this embodiment, the receiver 41 is further configured to receive a UE connection release request message sent by a second network device; and receive a UE context release complete indication message sent by the second network device; and the sender 43 is further configured to send a UE connection release response message to the second network device, where the UE connection release response message carries network standard indication information and/or frequency indication information.

In this embodiment, the processor 42 is further configured to update the paging management context of the UE according to the network standard indication information and/or the frequency indication information.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A mobility management method comprising:
receiving, by a single radio controller (SRC), a paging message for a user equipment (UE) sent by at least one first network device, wherein the paging message carries a user identifier used for indicating the UE, wherein the paging message is sent by the at least one first network device after a serving gateway (S-GW) receives downlink data for the UE and the S-GW separately sends a downlink data notification message to a Mobility Management Entity (MME) and a serving GPRS support node (SGSN), and wherein the at least one first network device is a MME, a SGSN, or a device downstream from the MME or the SGSN;
determining, by the SRC, a paging management context of the UE according to the user identifier in the paging message, wherein the paging management context of the UE records radio access technology (RAT) type information, and the RAT type information is used for indicating a RAT type on which the UE camps when switching to an idle state or a RAT type to which the UE is redirected after switching to an idle state; and
determining, by the SRC, a paging range according to the paging message and the paging management context of the UE, and initiating paging on the UE in a cell in the paging range.

2. The mobility management method according to claim 1,
wherein the paging message received by the SRC comprises a first paging message; and
wherein the determining, by the SRC, a paging range according to the paging message and the paging management context of the UE comprises:
when the SRC first receives the first paging message from an interface of a first RAT type same as the RAT type indicated by the RAT type information, determining the paging range in the first RAT type according to a historical record of the UE or a preset policy; or
when the paging management context of the UE further records a cell identity used for indicating a cell on which the UE camps when switching to the idle state or a cell identity used for indicating a cell to which the UE is redirected after switching to the idle state, determining the paging range in the first RAT type according to a cell identity.

3. The mobility management method according to claim 2, wherein the paging message carries a location area identity; and after the initiating paging on the UE in a cell in the paging range, the method further comprises:
- when the SRC does not receive a paging response from the UE during a first preset time, determining, according to the location area identity in the first paging message, all cells with which the UE registers in the first RAT type; and
- initiating, by the SRC, paging on the UE in the all cells with which the UE registers in the first RAT type.

4. The mobility management method according to claim 3,
- wherein the paging message received by the SRC further comprises a second paging message, and the first RAT type to which the first paging message belongs is different from a second RAT type to which the second paging message belongs; and
- wherein after the initiating paging on the UE in the all cells with which the UE registers in the first RAT type, the method further comprises:
  - when the SRC does not receive the paging response from the UE during a second preset time, determining, according to the location area identity in the first paging message and a location area identity in the second paging message, all cells with which the UE registers in the first RAT type and the second RAT type; and
  - initiating, by the SRC, paging on the UE in the all cells with which the UE registers in the first RAT type and the second RAT type.

5. The mobility management method according to claim 1,
- wherein the paging message carries a location area identity, the paging message received by the SRC comprises a first paging message and a second paging message, and the paging management context of the UE further records a cell identity used for indicating a cell on which the UE camps when switching to the idle state or a cell identity used for indicating a cell to which the UE is redirected after switching to the idle state; and
- wherein the determining, by the SRC, a paging range according to the paging message and the paging management context of the UE comprises:
  - when the SRC first receives the first paging message from a first interface of a first RAT type, the first RAT type is the same as the RAT type indicated by the RAT type information, and the first interface is different from a second interface corresponding to the cell indicated by the cell identity, determining the paging range according to a location area identity in the first paging message, and preparing a paging resource according to the paging range; and when the second paging message is received from the second interface of the first RAT type before paging is performed by using the paging resource, releasing the paging resource, and determining, according to one or more of the cell identity, a historical record of the UE, a preset policy, and a location area identity in the second paging message, the paging range in a cell of a second network device corresponding to the second interface; or
  - when the SRC first receives the first paging message from a first interface of a first RAT type, the first RAT type is the same as the RAT type indicated by the RAT type information, the first interface is different from a second interface corresponding to the cell indicated by the cell identity, and the second paging message is received from the second interface of the first RAT type during a third preset time, determining, according to one or more of the cell identity, a historical record of the UE, a preset policy, and a location area identity in the second paging message, the paging range in a cell of a second network device corresponding to the second interface; or
  - when the SRC first receives the first paging message from a first interface of a first RAT type, the first RAT type is the same as the RAT type indicated by the RAT type information, and the first interface is the same as a second interface corresponding to the cell indicated by the cell identity, determining the paging range according to a location area identity in the first paging message, and paging the UE according to the paging range; and when the second paging message is received from a third interface of the first RAT type during a fourth preset time, and the third interface is different from the second interface, after the fourth preset time elapses and when a paging response from the UE is not received, determining, according to one or more of the cell identity, a historical record of the UE, a preset policy, and location area identities in the first paging message and the second paging message, the paging range in a cell of a second network device corresponding to the first interface and the second interface.

6. The mobility management method according to claim 1,
- wherein the paging message carries a location area identity, and the paging message received by the SRC comprises a first paging message and a second paging message; and
- wherein the determining, by the SRC, a paging range according to the paging message and the paging management context of the UE comprises:
  - when the SRC first receives the first paging message from an interface of a first RAT type different from the RAT type indicated by the RAT type information, determining the paging range according to a location area identity in the first paging message, and preparing a paging resource according to the paging range; and when the second paging message is received, before paging is performed by using the paging resource, from an interface of a second RAT type same as the RAT type indicated by the RAT type information, releasing the paging resource, and determining the paging range in the second RAT type according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determining the paging range in the second RAT type according to the cell identity; or
  - when the SRC first receives the first paging message from an interface of a first RAT type different from the RAT type indicated by the RAT type information, and receives the second paging message during a third preset time from an interface of a second RAT type same as the RAT type indicated by the RAT type information, determining the paging range in the second RAT type according to one or more of a historical record of the UE, a preset policy, and a location area identity in the second paging message; or when the SRC first receives the first paging message from an interface of a first RAT type different from the RAT type indicated by the RAT type information, and the paging management context of the UE further records a cell identity used for indicating a cell on which the UE camps when switching to the idle state or a cell identity used for indicating a cell to which the UE is redirected after switching to the idle state, determining the paging range in the second RAT type according to the cell identity.

7. The mobility management method according to claim 6, wherein after the initiating paging on the UE in a cell in the paging range, the method further comprises:
when the SRC does not receive a paging response from the UE during a first preset time, determining, according to the location area identity in the second paging message, all cells with which the UE registers in the second RAT type; and
initiating, by the SRC, paging on the UE in the all cells with which the UE registers in the second RAT type.

8. The mobility management method according to claim 7, wherein after the initiating, by the SRC, paging on the UE in the all cells with which the UE registers in the second RAT type, the method further comprises:
when the SRC does not receive the paging response from the UE during a second preset time, determining, according to the location area identity in the first paging message and the location area identity in the second paging message, all cells with which the UE registers in the first RAT type and the second RAT type; and
initiating, by the SRC, paging on the UE in the all cells with which the UE registers in the first RAT type and the second RAT type.

9. The mobility management method according to claim 1, wherein the paging message carries activation indication information and a location area identity, and the paging message received by the SRC comprises a first paging message and a second paging message; and
wherein the determining, by the SRC, a paging range according to the paging message and the paging management context of the UE comprises:
when the SRC first receives the first paging message from an interface of a first RAT type different from the RAT type indicated by the RAT type information, and activation indication information in the first paging message is used for indicating that idle state signaling reduction (ISR) of the UE is activated, preparing a paging resource according to a location area identity in the first paging message; and when the second paging message is received, before paging is performed by using the paging resource, from an interface of a second RAT type same as the RAT type indicated by the RAT type information, releasing the paging resource, and determining the paging range in the second network standard according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determining the paging range in the second RAT type according to the cell identity; or when the SRC first receives the first paging message from an interface of a first RAT type different from the RAT type indicated by the RAT type information, activation indication information in the first paging message is used for indicating that ISR of the UE is activated, and the second paging message is received during a third preset time from an interface of a second RAT type same as the RAT type indicated by the RAT type information, releasing a paging resource, and determining the paging range in the second RAT type according to one or more of a historical record of the UE, a preset policy, and a location area identity in the second paging message; or when the SRC first receives the first paging message from an interface of a first RAT type different from the RAT type indicated by the RAT type information, activation indication information in the first paging message is used for indicating that ISR of the UE is activated, and the paging management context of the UE further records a cell identity used for indicating a cell on which the UE camps when switching to the idle state or a cell identity used for indicating a cell to which the UE is redirected after switching to the idle state, determining the paging range in the second RAT type according to the cell identity; or
when the SRC first receives the first paging message from an interface of a first RAT type different from the RAT type indicated by the RAT type information, and activation indication information in the first paging message is used for indicating that ISR of the UE is not activated, determining the paging range in the first RAT type according to a location area identity in the first paging message.

10. The mobility management method according to claim 1, wherein before the receiving, by an SRC, a paging message for a user equipment (UE) sent by at least one first network device, the method further comprises:
receiving, by the SRC, a detect UE deactivation message sent by a second network device, and sending a UE context release request message to the at least one first network device;
receiving, by the SRC, a UE context release command message sent by the first network device, and sending a radio resource control (RRC) context release indication message to the second network device, wherein the RRC context release indication message carries RAT type indication information and/or frequency indication information; and
receiving, by the SRC, a UE context release complete indication message sent by the second network device, and sending a UE context release complete message to the at least one first network device.

11. A single radio controller comprising:
a receiver configured to receive a paging message for a user equipment (UE) sent by at least one first network device, wherein the paging message carries a user identifier used for indicating the UE, wherein the paging message is sent by the at least one first network device after a serving gateway (S-GW) receives downlink data for the UE and the S-GW separately sends a downlink data notification message to a Mobility Management Entity (MME) and a serving GPRS support node (SGSN), and wherein the at least one first network device is a MME, a SGSN, or a device downstream from the MME or the SGSN;

a processor configured to determine a paging management context of the UE according to the user identifier in the paging message received by the receiver, and determine a paging range according to the paging message and the paging management context of the UE, wherein the paging management context of the UE records radio access technology (RAT) type information, and the RAT type information is used for indicating a RAT type on which the UE camps when switching to an idle state or a RAT type to which the UE is redirected after switching to an idle state; and a transmitter configured to initiate paging on the UE in a cell in the paging range determined by the processor.

12. The single radio controller according to claim 11, wherein the paging message received by the receiver comprises a first paging message; and the processor is specifically configured to, when a first paging message is first received from an interface of a first RAT type same as the RAT type indicated by the RAT type information, determine the paging range in the first RAT type according to a historical record of the UE or a preset policy; or when the paging management context of the UE further records a cell identity used for indicating a cell on which the UE camps when switching to the idle state or a cell identity used for indicating a cell to which the UE is redirected after switching to the idle state, determine the paging range in the first RAT type according to a cell identity.

13. The single radio controller according to claim 12, wherein the paging message carries a location area identity;

the processor is further configured to, when a paging response from the UE is not received during a first preset time, determine, according to a location area identity in the first paging message, all cells with which the UE registers in the first RAT type; and the transmitter is further configured to initiate paging on the UE in the all cells with which the UE registers in the first RAT type.

14. The single radio controller according to claim 13, wherein the paging message received by the receiver further comprises a second paging message, and the first RAT type to which the first paging message belongs is different from a second RAT type to which the second paging message belongs;

the processor is further configured to, when the paging response from the UE is not received during a second preset time, determine, according to the location area identity in the first paging message and a location area identity in the second paging message, all cells with which the UE registers in the first RAT type and the second RAT type; and the transmitter is further configured to initiate paging on the UE in the all cells with which the UE registers in the first RAT type and the second RAT type.

15. The single radio controller according to claim 11, wherein the paging message carries a location area identity, the paging message received by the receiver comprises a first paging message and a second paging message, and the paging management context of the UE further records a cell identity used for indicating a cell on which the UE camps when switching to the idle state or a cell identity used for indicating a cell to which the UE is redirected after switching to the idle state; and the processor is specifically configured to, when the first paging message is first received from a first interface of a first RAT type, the first RAT type is the same as the RAT type indicated by the RAT type information, and the first interface is different from a second interface corresponding to the cell indicated by the cell identity, determine the paging range according to a location area identity in the first paging message, and prepare a paging resource according to the paging range; and when the second paging message is received from the second interface of the first RAT type before paging is performed by using the paging resource, release the paging resource, and determine, according to one or more of the cell identity, a historical record of the UE, a preset policy, and a location area identity in the second paging message, the paging range in a cell of a second network device corresponding to the second interface; or when the first paging message is first received from a first interface of a first RAT type, the first RAT type is the same as the RAT type indicated by the RAT type information, the first interface is different from a second interface corresponding to the cell indicated by the cell identity, and the second paging message is received from the second interface of the first RAT type during a third preset time, determine, according to one or more of the cell identity, a historical record of the UE, a preset policy, and a location area identity in the second paging message, the paging range in a cell of a second network device corresponding to the second interface; or when the first paging message is first received from a first interface of a first RAT type, the first RAT type is the same as the RAT type indicated by the RAT type information, and the first interface is the same as a second interface corresponding to the cell indicated by the cell identity, determine the paging range according to a location area identity in the first paging message, and page the UE according to the paging range; and when the second paging message is received from a third interface of the first RAT type during a fourth preset time, and the third interface is different from the second interface, after the fourth preset time elapses and when a paging response from the UE is not received, determine, according to one or more of the cell identity, a historical record of the UE, a preset policy, and location area identities in the first paging message and the second paging message, the paging range in a cell of a second network device corresponding to the first interface and the second interface.

16. The single radio controller according to claim 11, wherein the paging message carries a location area identity, and the paging message received by the receiver comprises a first paging message and a second paging message; and the processor is specifically configured to, when the first paging message is first received from an interface of a first RAT type different from the RAT type indicated by the RAT type information, determine the paging range according to a location area identity in the first paging message, and prepare a paging resource according to the paging range; and when the second paging message is received, before paging is performed by using the paging resource, from an interface of a second RAT type same as the RAT type indicated by the RAT type information, release the paging resource, and determine the paging range in the second RAT type according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second network standard according to the cell identity; or when the first paging message is first received from an interface of a first RAT type different from the RAT type indicated by the RAT type information, and the second paging message is received during a third preset time from an interface of a second RAT type same as the RAT type indicated by the RAT type information, determine the paging range in the second RAT type according to one or more of a historical record of the UE, a preset policy, and a location area identity in the second paging message; or when the first paging message is first received from an interface of a first RAT type different from the RAT type indicated by the RAT type information, and the paging management context of the UE further records a cell identity used for indicating a cell on which the UE camps when switching to the idle state or a cell identity used for indicating a cell to which the UE is redirected after switching to the idle state, determine the paging range in the second RAT type according to the cell identity.

17. The single radio controller according to claim 16, wherein:
the processor is further configured to,
when a paging response from the UE is not received during a first preset time, determine, according to the location area identity in the second paging message, all cells with which the UE registers in the second RAT type; and
the transmitter is further configured to initiate paging on the UE in the all cells with which the UE registers in the second RAT type.

18. The single radio controller according to claim 17, wherein:
the processor is further configured to,
when the paging response from the UE is not received during a second preset time, determine, according to the location area identity in the first paging message and the location area identity in the second paging message, all cells with which the UE registers in the first RAT type and the second RAT type; and
the transmitter is further configured to initiate paging on the UE in the all cells with which the UE registers in the first RAT type and the second RAT type.

19. The single radio controller according to claim 11, wherein the paging message carries activation indication information and a location area identity, and the paging message received by the receiver comprises a first paging message and a second paging message; and
the processor is specifically configured to,
when the first paging message is first received from an interface of a first RAT type different from the RAT type indicated by the RAT type information, and activation indication information in the first paging message is used for indicating that idle state signaling reduction (ISR) of the UE is activated, prepare a paging resource according to a location area identity in the first paging message; and when the second paging message is received, before paging is performed by using the paging resource, from an interface of a second RAT type same as the RAT type indicated by the RAT type information, release the paging resource, and determine the paging range in the second RAT type according to one or more of a historical record of the UE, a preset policy, and a location area identity in the second paging message, or when the paging management context of the UE further records a cell identity used for indicating a cell on which the UE camps when switching to the idle state or a cell identity used for indicating a cell to which the UE is redirected after switching to the idle state, determine the paging range in the second RAT type according to the cell identity; or when the first paging message is first received from an interface of a first RAT type different from the RAT type indicated by the RAT type information, activation indication information in the first paging message is used for indicating that ISR of the UE is activated, and the second paging message is received during a third preset time from an interface of a second RAT type same as the RAT type indicated by the RAT type information, release a paging resource, and determine the paging range in the second RAT type according to one or more of a historical record of the UE, a preset policy, and a location area identity in the second paging message; or when the first paging message is first received from an interface of a first RAT type different from the RAT type indicated by the RAT type information, activation indication information in the first paging message is used for indicating that ISR of the UE is activated, and the paging management context of the UE further records a cell identity used for indicating a cell on which the UE camps when switching to the idle state or a cell identity used for indicating a cell to which the UE is redirected after switching to the idle state, determine the paging range in the second RAT type according to the cell identity; or when the first paging message is first received from an interface of a first RAT type different from the RAT type indicated by the RAT type information, and activation indication information in the first paging message is used for indicating that ISR of the UE is not activated, determine the paging range in the first RAT type according to a location area identity in the first paging message.

20. The single radio controller according to claim 11, wherein:
the receiver is further configured to receive a detect UE deactivation message sent by a second network device; receive a UE context release command message sent by the first network device; and receive a UE context release complete indication message sent by the second network device; and
the transmitter is further configured to send a UE context release request message to the first network device; send a radio resource control (RRC) context release indication message to the second network device, wherein the RRC context release indication message carries RAT type indication information and/or frequency indication information; and send a UE context release complete message to the first network device.

* * * * *